US012440409B2

(12) United States Patent
Ross et al.

(10) Patent No.: US 12,440,409 B2
(45) Date of Patent: Oct. 14, 2025

(54) PATIENT SUPPORT SYSTEM INCLUDING EXPANDABLE PATIENT SUPPORT AND CONTROL ASSEMBLY

(71) Applicant: Stryker Corporation, Kalamazoo, MI (US)

(72) Inventors: Ryan Ross, New Carlisle, IN (US); Robert Gregory Cox, Portage, MI (US); Adam Robert Hoke, Shelbyville, MI (US); Krista Lynn Fox-Walsh, Kalamazoo, MI (US)

(73) Assignee: Stryker Corporation, Portage, MI (US)

(*) Notice: Subject to any disclaimer, the term of this patent is extended or adjusted under 35 U.S.C. 154(b) by 189 days.

(21) Appl. No.: 18/009,105

(22) PCT Filed: Sep. 29, 2021

(86) PCT No.: PCT/US2021/052601
§ 371 (c)(1),
(2) Date: Dec. 8, 2022

(87) PCT Pub. No.: WO2022/072464
PCT Pub. Date: Apr. 7, 2022

(65) Prior Publication Data

US 2023/0248599 A1 Aug. 10, 2023

Related U.S. Application Data

(60) Provisional application No. 63/084,808, filed on Sep. 29, 2020.

(51) Int. Cl.

| | |
|---|---|
| *A61G 7/057* | (2006.01) |
| *A47C 27/10* | (2006.01) |
| *A61G 7/018* | (2006.01) |

(52) U.S. Cl.
CPC .......... *A61G 7/05769* (2013.01); *A47C 27/10* (2013.01); *A61G 7/018* (2013.01)

(58) Field of Classification Search
CPC ... A47C 27/082; A47C 27/083; A47C 27/084; A47C 27/10; A47C 27/128; A47C 27/18;
(Continued)

(56) References Cited

U.S. PATENT DOCUMENTS 7,198,076 B2 4/2007 Wu
7,225,488 B2 6/2007 Wu
(Continued)

FOREIGN PATENT DOCUMENTS

EP 2877058 B1 12/2018

OTHER PUBLICATIONS

International Search Report for Application No. PCT/US2021/052601 dated Jan. 28, 2022, 2 pages.
(Continued)

*Primary Examiner* — George Sun
(74) *Attorney, Agent, or Firm* — Howard & Howard Attorneys PLLC

(57) ABSTRACT

A patient support system is provided for use on a litter of a patient support apparatus. The patient support system includes an expandable patient support and a control assembly connectable to the expandable patient support. The control assembly includes an inflator and a controller configured to provide pressure in one or more inner bladders at a first value when the expandable patient support is at a first width and reduce the pressure in the one or more inner bladders to a second value, lower than the first value, in response to inflating one or more outer bladders to expand the expandable patient support to a second width.

15 Claims, 15 Drawing Sheets

(58) Field of Classification Search
CPC ...... A61G 7/002; A61G 7/018; A61G 7/0525; A61G 7/05769; A61G 13/129; A61G 2200/16; A61G 2203/34
See application file for complete search history.

(56) References Cited

U.S. PATENT DOCUMENTS

| | | | | |
|---|---|---|---|---|
| 7,406,729 | B2 * | 8/2008 | Hornbach ................ | A61G 7/05 5/613 |
| 7,571,500 | B2 | 8/2009 | Wu | |
| 8,911,387 | B2 | 12/2014 | Lafleche et al. | |
| 10,188,569 | B2 | 1/2019 | Elku et al. | |
| 10,507,147 | B2 | 12/2019 | Bobey et al. | |
| 11,484,449 | B2 * | 11/2022 | Tumavich .............. | A61G 7/015 |
| 2002/0133883 | A1 * | 9/2002 | Perez ................... | A47C 27/082 5/713 |
| 2004/0064895 | A1 * | 4/2004 | Hochschild ............ | A47C 27/18 5/738 |
| 2006/0101580 | A1 * | 5/2006 | Biggie ............... | A61G 7/05776 5/713 |
| 2006/0184079 | A1 * | 8/2006 | Evans .................. | A47C 27/082 601/150 |
| 2011/0047709 | A1 * | 3/2011 | Tarsaud ............. | A61G 7/05776 33/700 |
| 2012/0297540 | A1 * | 11/2012 | Thomas ............... | A61G 7/0515 5/424 |
| 2014/0047641 | A1 | 2/2014 | Thodupunuri et al. | |
| 2017/0143566 | A1 * | 5/2017 | Elku .................... | A61G 7/0512 |
| 2018/0027988 | A1 * | 2/2018 | Poodeh ................ | A47G 9/1027 |
| 2020/0138656 | A1 * | 5/2020 | Davis ..................... | A61G 7/001 |
| 2020/0400149 | A1 | 12/2020 | Huang et al. | |
| 2021/0045947 | A1 | 2/2021 | Tumavich et al. | |
| 2021/0045950 | A1 * | 2/2021 | Connell ................. | A61G 7/015 |

OTHER PUBLICATIONS

Youtube, "Lightspeed Outdoors PVC-Free Air Bed Video", https://www.youtube.com/watch?v=J7EZujcH4gQ, 2013, 3 pages.

* cited by examiner

PATIENT SUPPORT SYSTEM INCLUDING EXPANDABLE PATIENT SUPPORT AND CONTROL ASSEMBLY

CROSS-REFERENCE TO RELATED APPLICATION

The subject patent application claims priority to and all the benefits of U.S. Provisional Patent Application No. 63/084,808, filed on Sep. 29, 2020, the entire contents and disclosure of which is hereby incorporated by reference in its entirety.

BACKGROUND

A patient support system including an expandable patient support (e.g., an expandable mattress) is often used in conjunction with a patient support apparatus (e.g., a hospital bed) to accommodate patients of different sizes. The expandable patient support, and the patient support apparatus on which it is arranged, can typically be configured to expand/collapse to a plurality of different widths. There is a need for systems and methods that control expansion and/or collapse of the expandable patient support.

SUMMARY

The present disclosure provides a patient support system for use on a litter of a patient support apparatus, the patient support system may include: an expandable patient support including: a main patient support section having opposing sides; and an auxiliary patient support section having one or more inner bladders extending longitudinally along one of the opposing sides of the main patient support section and one or more outer bladders extending longitudinally along the one or more inner bladders, the one or more outer bladders being expandable away from the one or more inner bladders to expand an overall width of the expandable patient support from a first width to a second width; and a control assembly connectable to the expandable patient support, the control assembly including: an inflator to be operatively coupled to the one or more inner bladders and the one or more outer bladders; and a controller coupled to the inflator, where the controller is configured to provide pressure in the one or more inner bladders at a first value when the expandable patient support is at the first width and the controller is configured to reduce the pressure in the one or more inner bladders to a second value, lower than the first value, in response to inflating the one or more outer bladders to expand the expandable patient support to the second width.

The present disclosure also provides a method for reconfiguring a patient support system for use on a litter of a patient support apparatus, the patient support system including an expandable patient support having a main patient support section and an auxiliary patient support section, and a control assembly including an inflator to expand the auxiliary patient support section, the method may include the steps of: providing pressure in one or more inner bladders of the auxiliary patient support section at a first value when the expandable patient support is at a first width, the one or more inner bladders extending longitudinally along one side of the main patient support section; inflating one or more outer bladders of the auxiliary patient support section to expand the expandable patient support from the first width to a second width, the one or more outer bladders extending longitudinally along the one or more inner bladders; and reducing the pressure in the one or more inner bladders to a second value, lower than the first value, in response to inflating the one or more outer bladders to expand the expandable patient support to the second width.

The present disclosure also provides a patient support system for use on a litter of a patient support apparatus, the patient support system may include: a patient support having one or more bladders; a low air loss circuit arranged to diffuse air to one or more regions of the patient support to manage temperature and moisture of the patient support; a pump capable of producing a vacuum pressure at an inlet and a positive pressure at an outlet, the pump configured to direct air through one or more supply lines coupled to the outlet to inflate the one or more bladders or operate the low air loss circuit; one or more bladder vent valves operatively coupled to the one or more bladders and configured to move between an open state and a closed state; a pump vent valve operatively coupled to the pump and configured to move between a first state and a second state, where: the inlet of the pump is coupled in fluid communication with the one or more bladders when the pump vent valve is in the first state and the one or more bladder vent valves are in the open state such that the vacuum pressure of the inlet deflates the one or more bladders; and the inlet of the pump in is fluid communication with atmosphere when the pump vent valve is in the second state; and a controller coupled to the pump, the one or more bladder vent valves, and the pump vent valve, where the controller is configured to: operate the patient support system in a first mode where the one or more bladder vent valves are in the closed state, and the pump vent valve is in the second state such that the pump directs air from atmosphere to the one or more supply lines to inflate the one or more bladders; operate the patient support system in a second mode where the one or more bladder vent valves are in the closed state, and the pump vent valve is in the second state such that the pump directs air from atmosphere to the one or more supply lines to operate the low air loss circuit; and operate the patient support system in a third mode where the one or more bladder vent valves are in the open state, and the pump vent valve is in the first state such that the pump directs air from the one or more bladders to the one or more supply lines to operate the low air loss circuit. Other embodiments of this aspect include corresponding computer systems, apparatus, and computer programs recorded on one or more computer storage devices, each configured to perform the actions of the methods.

BRIEF DESCRIPTION OF THE DRAWINGS

Advantages of the present disclosure will be readily appreciated as the same becomes better understood by reference to the following detailed description when considered in connection with the accompanying drawings.

DETAILED DESCRIPTION

Figure 1:
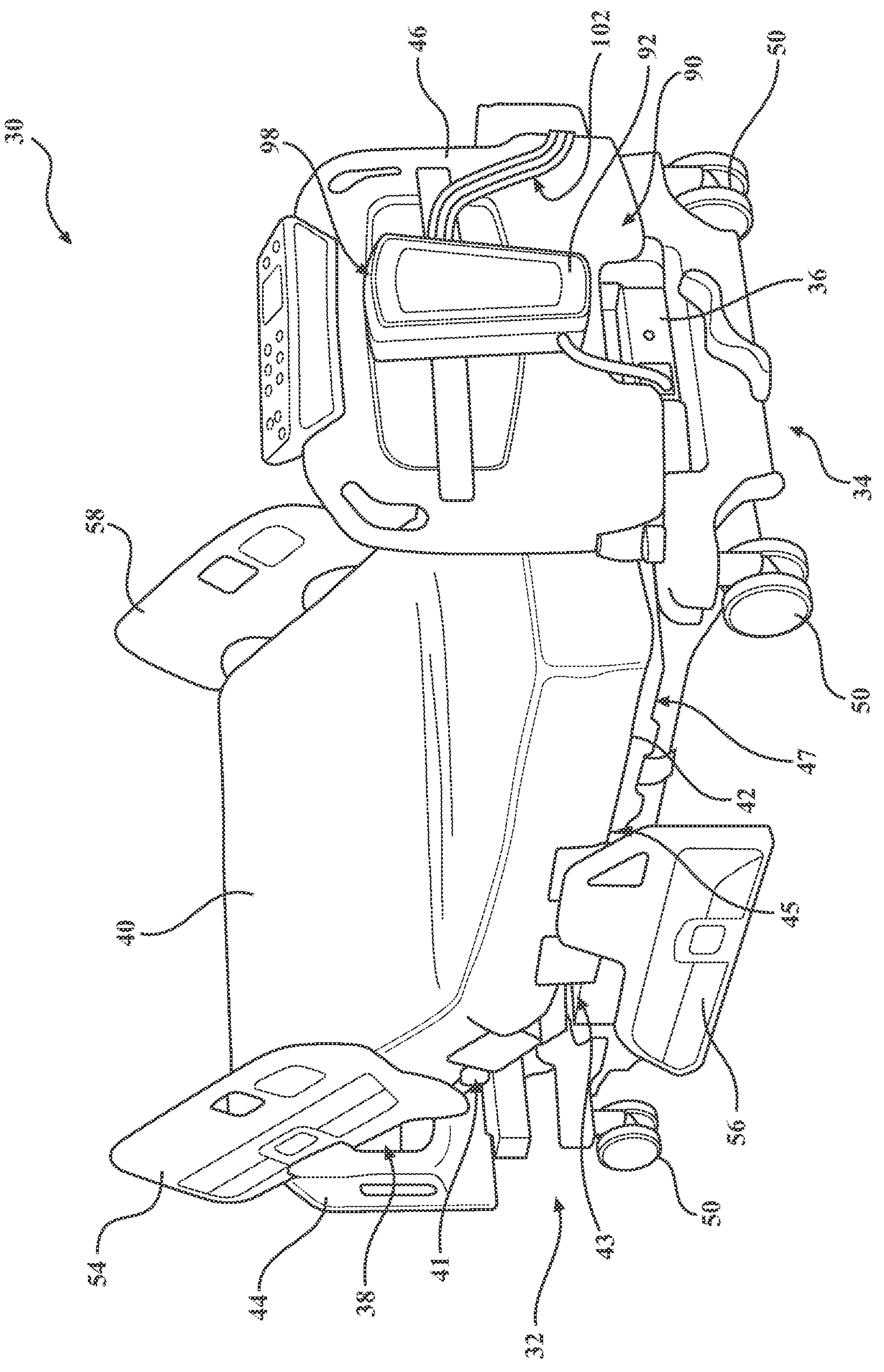
FIG. 1 is a perspective view of a patient support apparatus and a patient support system, the patient support system including an expandable patient support and a control assembly.

Referring to FIG. 1, a patient support apparatus 30 is shown for supporting a patient in a health care setting. The patient support apparatus 30 illustrated in FIG. 1 is a hospital bed. In some embodiments, however, the patient support apparatus 30 may be a stretcher, cot, table, wheelchair, or similar apparatus utilized in the care of a patient.

A support structure 32 provides support for the patient. The support structure 32 illustrated in FIG. 1 includes a base 34 and a support frame 36. The support structure 32 also includes a patient support deck 38 disposed on the support frame 36. The patient support deck 38 includes several deck sections, some of which articulate (e.g., pivot) relative to the support frame 36, such as a back section 41 (also referred to as a fowler section), a seat section 43, a thigh section 45, and a foot section 47. More or fewer deck sections may be present in some embodiments. The patient support deck 38 provides a patient support surface 42 upon which the patient is supported. Collectively, the support frame 36 and the patient support deck 38 form a litter of the patient support apparatus 30.

An expandable patient support 40 (e.g., an expandable mattress) is disposed on the patient support deck 38. The expandable patient support 40 provides a secondary patient support surface upon which the patient is supported. The expandable patient support 40 is expandable/collapsible to a plurality of different widths to accommodate patients of different sizes, as will be described further below. In the version shown in the figures, the expandable patient support 40 is capable of being configured in widths of 36 inches, 42 inches, and 48 inches. More, fewer, or different widths are also contemplated. The base 34, support frame 36, patient support deck 38, and patient support surfaces 42 each have a head end and a foot end corresponding to designated placement of the patient's head and feet on the patient support apparatus 30. The construction of the support structure 32 may take on any known or conventional design and is not limited to that specifically set forth above.

A headboard 44 and a footboard 46 may be coupled to the support frame 36. In other embodiments where the headboard 44 and footboard 46 are included, the headboard 44 and footboard 46 may be coupled to other locations on the patient support apparatus 30, such as the base 34. In still further embodiments, the patient support apparatus 30 does not include the headboard 44 and/or the footboard 46.

Wheels 50 are coupled to the base 34 to facilitate transport over the floor surfaces. The wheels 50 are arranged in each of four quadrants of the base 34 adjacent to corners of the base 34. In the embodiment shown, the wheels 50 are caster wheels able to rotate and swivel relative to the support structure 32 during transport.

Side rails 54, 56, 58, 60 are coupled to the support structure 32, such as by being coupled directly to the support frame 36 and/or the patient support deck 38. The side rails 54, 56, 58, 60 are thus indirectly supported by the base 34. A first side rail 54 is positioned at a right head end of the patient support apparatus 30. The first side rail 54 is coupled to the back section 41 of the patient support deck 38. A second side rail 56 is positioned at a right foot end of patient support apparatus 30. The second side rail 56 is coupled to the support frame 36. A third side rail 58 is positioned at a left head end of the patient support apparatus 30. The third side rail 58 is coupled to the back section 41 of the patient support deck 38. A fourth side rail 60 is positioned at a left foot end of the patient support apparatus 30. The fourth side rail 60 is coupled to the support frame 36.

It should be appreciated that the side rails 54, 56, 58, 60 may be mounted to other parts of the patient support apparatus 30. In some cases, all of the side rails 54, 56, 58, 60 are mounted to the support frame 36. In other cases, all of the side rails 54, 56, 58, 60 are mounted to the patient support deck 38. If the patient support apparatus 30 is a stretcher or a cot, there may be fewer side rails.

Figure 2C:
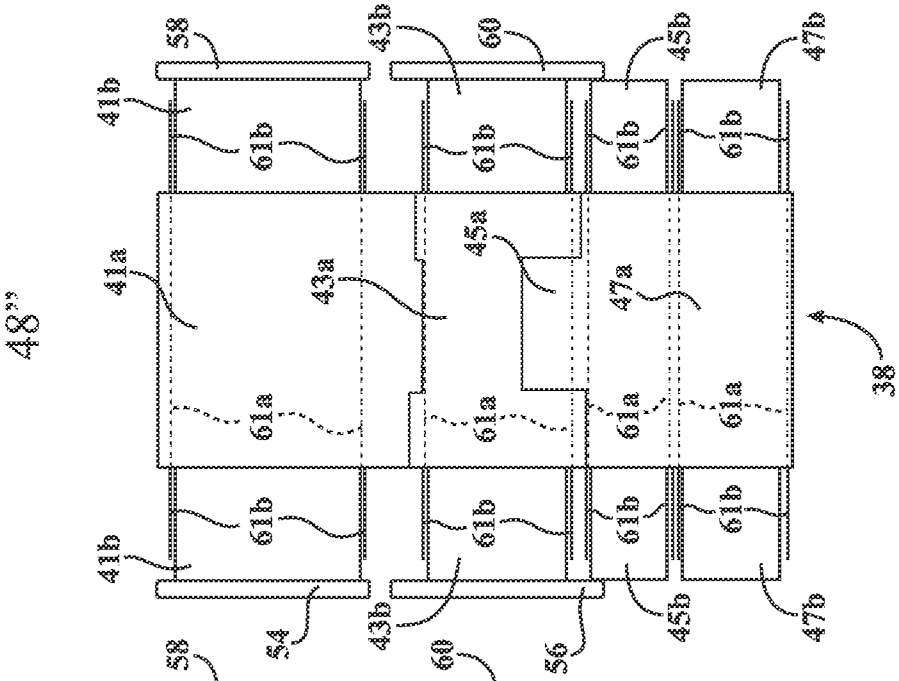
FIGS. 2A-2C are top, schematic views illustrating expansion of deck sections and side rails of the patient support apparatus to different widths.
Figure 2B:
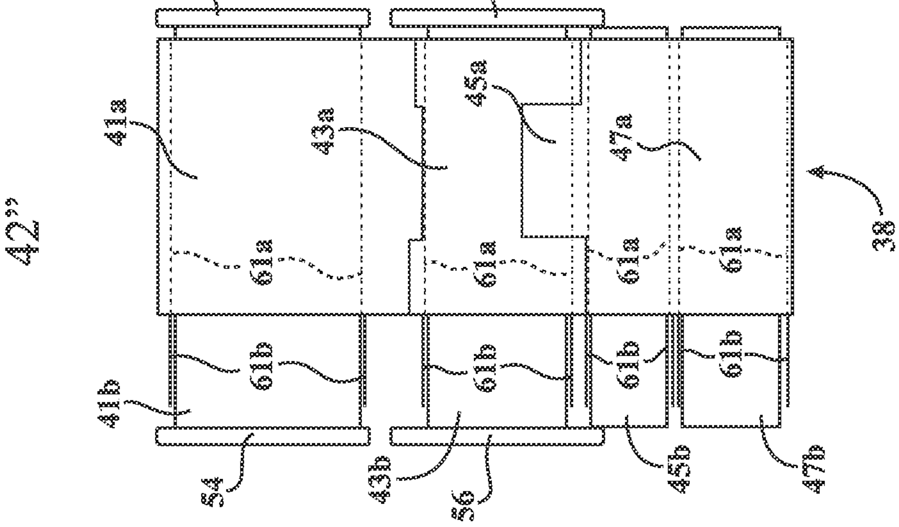
Figure 2A:
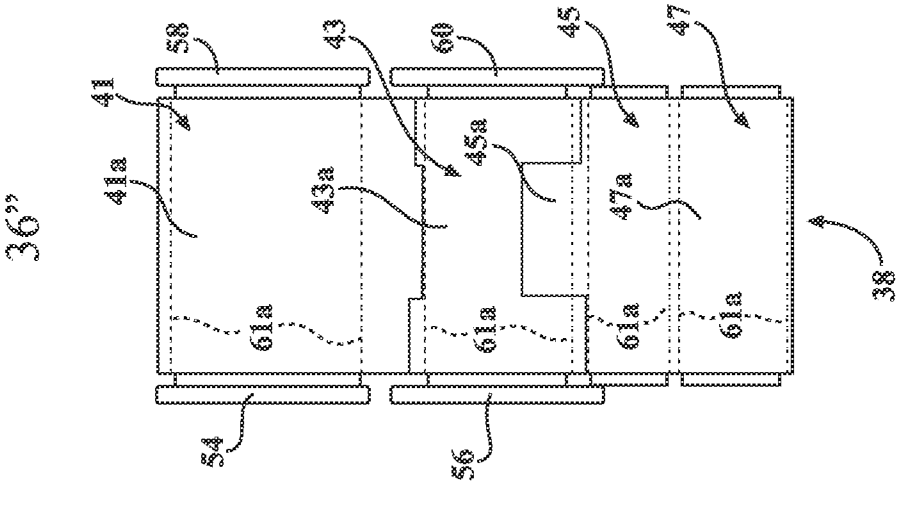

Referring to FIGS. 2A-2C, the patient support deck 38 is shown in more detail. The patient support deck 38 is expandable/collapsible to a plurality of different widths. In the version shown, the patient support deck 38 is capable of being configured in widths of 36 inches, 42 inches, and 48 inches. More, fewer, or different widths are also contemplated. In order to reconfigure the patient support deck 38 to a different width, each of the deck sections 41, 43, 45, 47 are expanded/collapsed as needed. These may be expanded/collapsed collectively, or some of the deck sections 41, 43, 45, 47 may be separately and independently expanded/collapsed. In the version shown, the back section 41, seat section 43, thigh section 45, and foot section 47, are independently and separately expandable/collapsible. In some versions, the thigh/foot sections 45, 47 expand/collapse together. Prior to expanding the expandable patient support 40, all the deck sections 41, 43, 45, 47 are expanded to accommodate the new width of the expandable patient support 40.

Expansion is shown in the transition from FIG. 2A to FIG. 2C. First slides 61*a* may be fixed to a center portion 41*a*, 43*a*, 45*a*, 47*a* of each deck section 41, 43, 45, 47 and second, complementary slides 61*b* (e.g., such as complementary drawer slides) may be fixed to expandable/collapsible wing portions 41*b*, 43*b*, 45*b*, 47*b* of each deck section 41, 43, 45, 47 so that the wing portions 41*b*, 43*b*, 45*b*, 47*b* are able to slide relative to their associated center portion 41*a*, 43*a*, 45*a*, 47*a* (e.g., similar to a drawer on a desk, cabinet, etc.) during expansion/collapse of the deck sections 41, 43, 45, 47. Other sliding mechanisms are also contemplated. Pivoting mechanisms may also be used to pivot the wing sections when expanding/collapsing the deck sections. Mechanisms for enabling a user to expand/collapse the patient support deck 38 are shown, for example, in U.S. Pat. No. 10,188,569, entitled "Patient Support Usable With Bariatric Patients," filed on Dec. 29, 2016, and in U.S. patent application Ser. No. 16/916,660, entitled "Patient Support With Deck Width Monitoring And Control," filed on Jun. 30, 2020, both of which are hereby incorporated herein by reference in their entirety.

Figure 3:
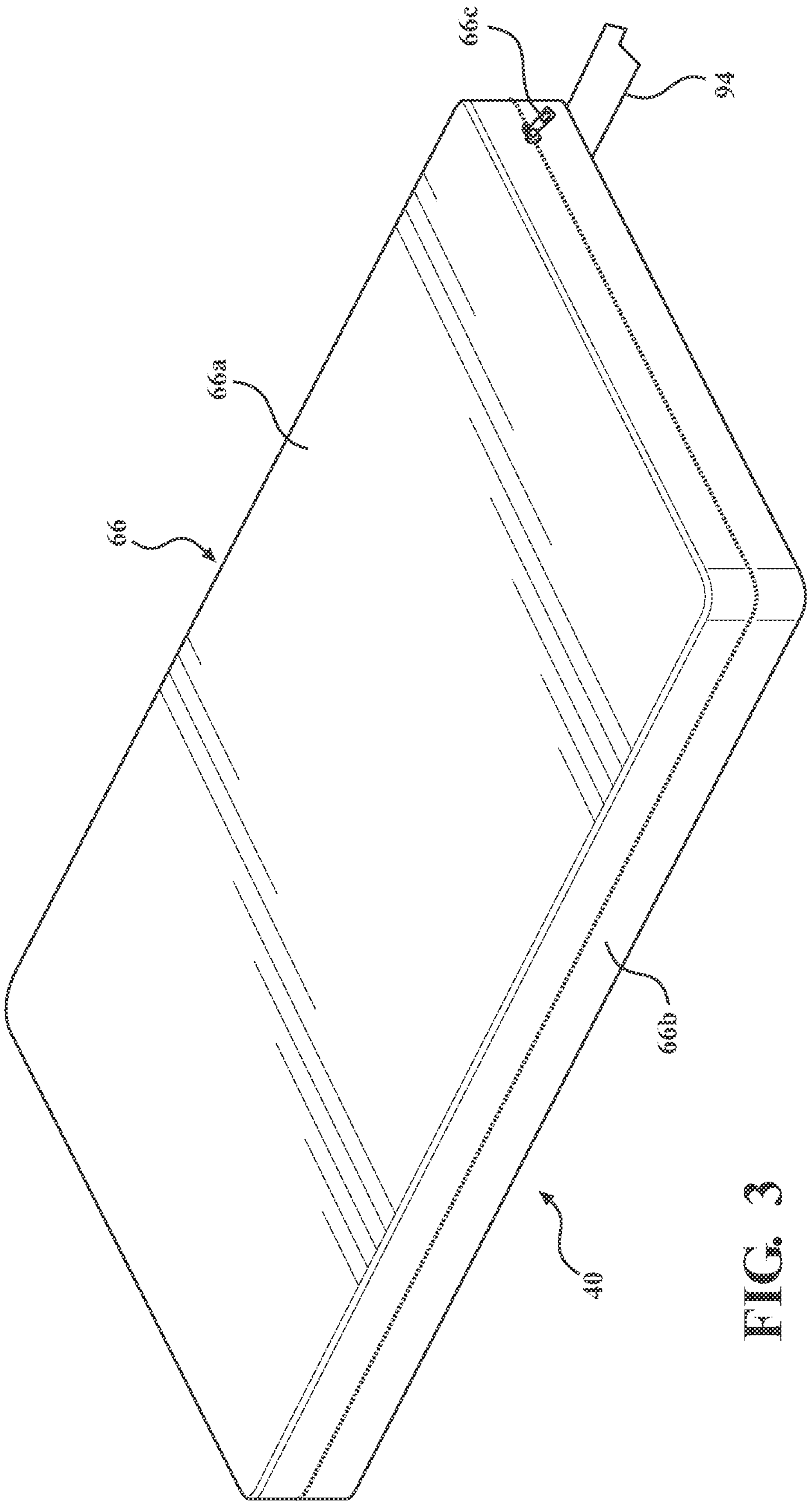
FIG. 3 shows a perspective view of the expandable patient support.
Figure 4:
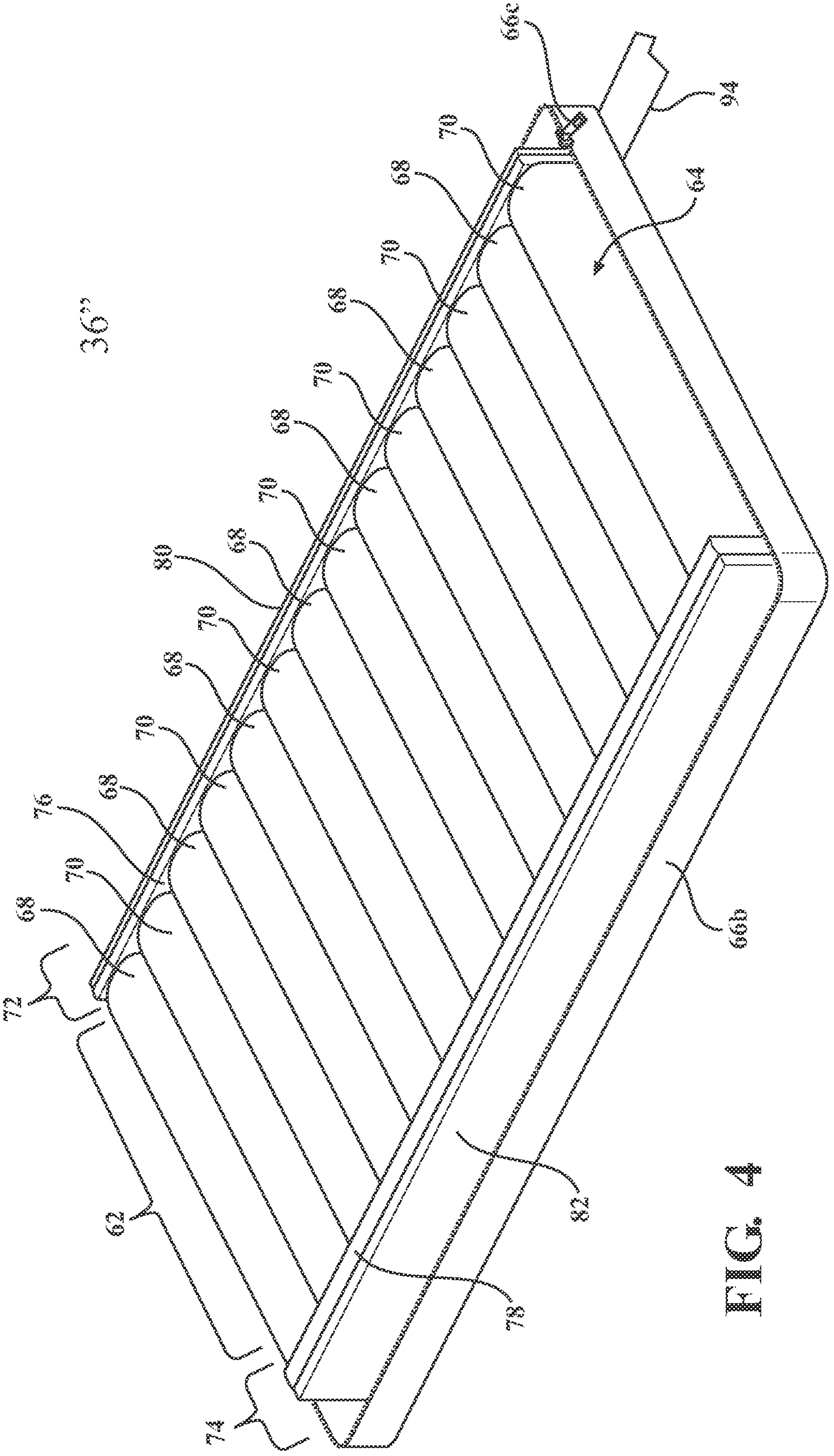
FIGS. 4-6 illustrate expansion of the expandable patient support.

The expandable patient support 40 is supported on the patient support deck 38 of the patient support apparatus 30. In some versions, such as shown in FIGS. 3 and 4, the expandable patient support 40 is an expandable mattress for supporting the patient when positioned on the patient support apparatus 30. The expandable patient support 40 includes a crib assembly 64 (see FIG. 4) and a cover assembly 66 (see FIG. 3) disposed over the crib assembly 64. In other words, the crib assembly 64 is disposed partially or entirely within the cover assembly 66. The crib assembly 64 may be formed of one or more layers/pieces of foam, one or more inflatable bladders, combinations thereof, and the like that are concealed and contained within the cover assembly 66. The cover assembly 66 may surround the crib assembly 64 on all sides and may include one or more cover layers, such as medical grade cover layers suitable for use on such patient supports. In the example of FIG. 3, the cover assembly 66 includes a top cover 66*a* and a bottom cover 66*b*. The top cover 66*a* is coupled to the bottom cover 66*b* via one or more fasteners 66*c*, such as one or more zippers, hook-and-loop type fasteners, snaps, buttons, and the like. The top cover 66*a* and the bottom cover 66*b* may be flexible and formed of any suitable material, such as materials that are moisture vapor permeable, but liquid impermeable material, such as GORE® Medical Fabric, available from W. L. Gore & Associates, Inc., of Elkton, Md. to facilitate moisture management of the patient.

Referring to FIG. 4, the top cover 66*a* has been removed to reveal the crib assembly 64. In the version shown, the crib assembly 64 defines a main patient support section 62 that includes a first plurality of main bladders 68 and a second plurality of main bladders 70. The main bladders 68, 70 may be arranged in different groups to form a main patient support surface. In the version shown, the main bladders 68, 70 are laterally arranged to extend in a widthwise direction on the patient support apparatus 30. The main bladders 68, 70 may each have a generally cylindrical shape, or any other suitable shape. The main bladders 68, 70 may be formed from one or more polymer sheets or elastomeric sheets, with one or more of the sheets being molded into the configuration as shown in FIG. 4 (e.g., injection molding, vacuum molding, or the like). For example, a suitable polymer sheet includes sheets formed from thermal polyurethane (TPU). The main bladders 68, 70 may be formed in groups, or each of the bladders may be individually molded and welded together (heat sealing or RF welding). Pressures in the first and second plurality of main bladders 68, 70 may be separately controlled to vary support configurations of the main patient support surface collectively formed by the first and second plurality of main bladders 68, 70. The number of main bladders 68, 70 may be increased or decreased. For example, additional rows may be provided at the head end, foot end, etc.

Figure 5:
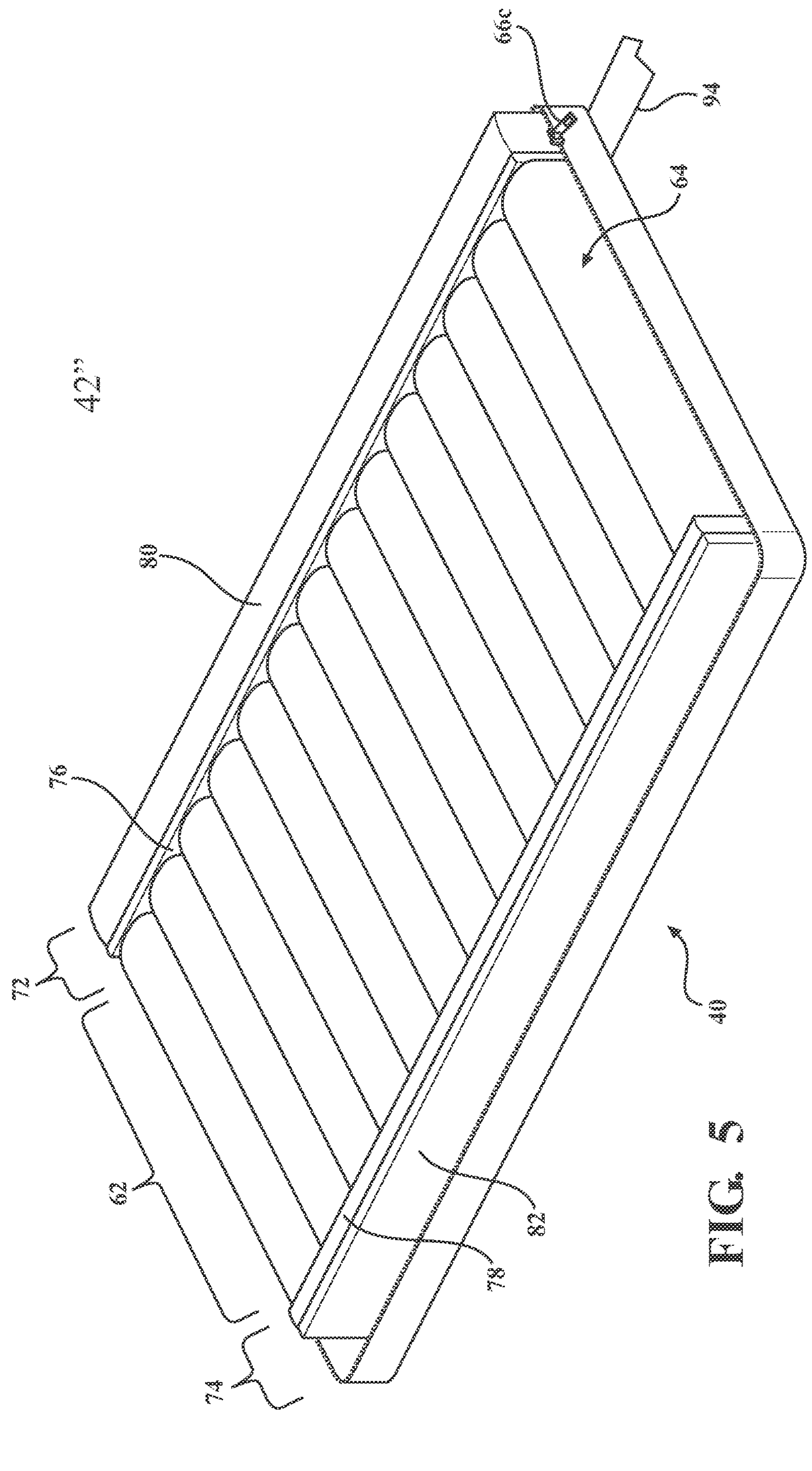
Figure 6:
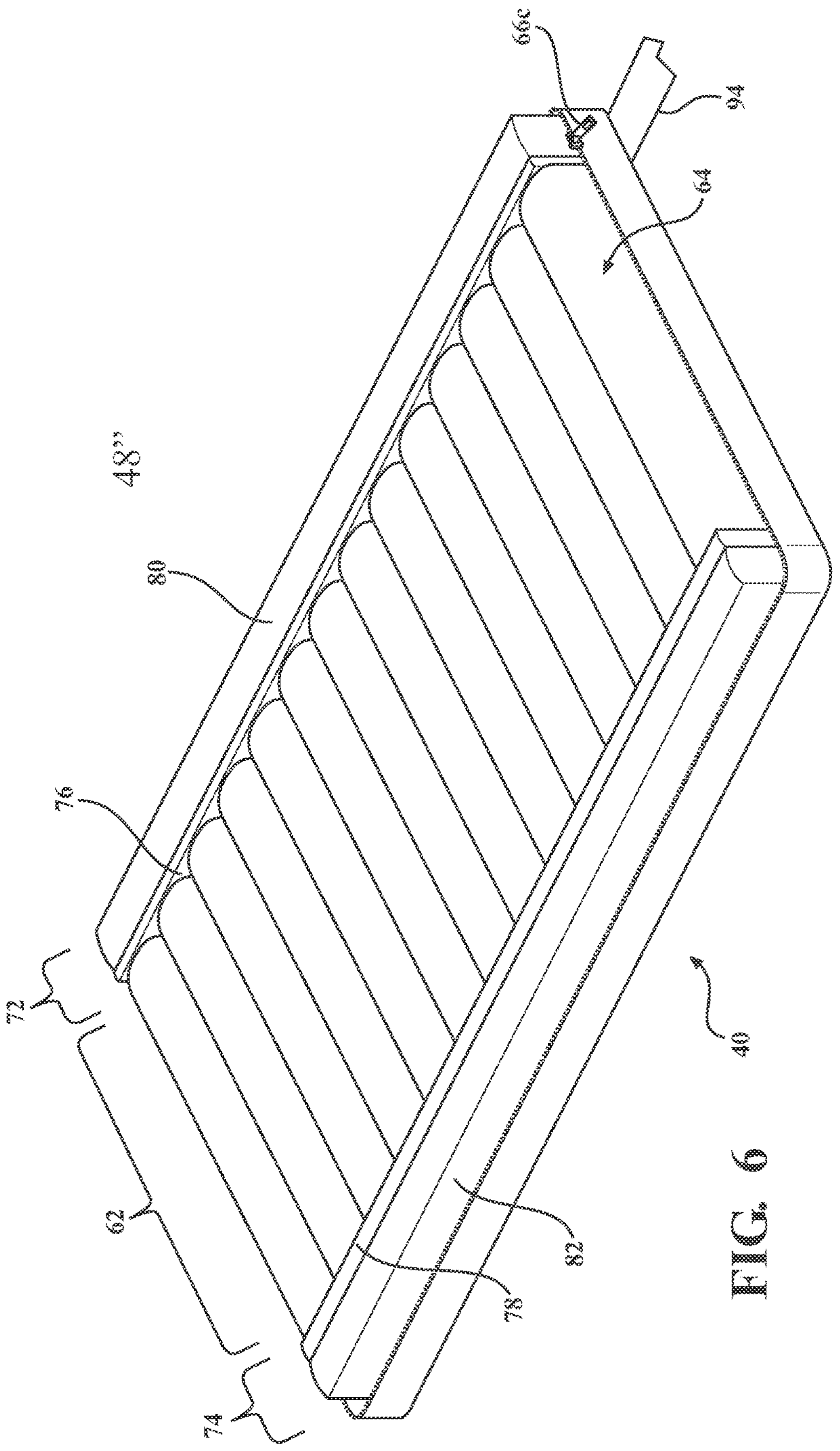

The expandable patient support 40 includes a first auxiliary patient support section 72 with a first auxiliary patient support surface and a second auxiliary patient support section 74 with a second auxiliary patient support surface. The first and second auxiliary patient support sections 72, 74 are expandable from respective first and second sides of the main patient support section 62 when expanding the expandable patient support 40 to the different widths. FIG. 5 illustrates the expandable patient support 40, for example, when expanded from 36 inches to 42 inches and FIG. 6 illustrates the expandable patient support 40 when expanded from 42 inches to 48 inches. The first and second auxiliary patient support sections 72, 74 may be sized so that they can be contained within the cover assembly 66 adjacent to the crib assembly 64 of the main patient support section 62 at all widths.

Figure 10:
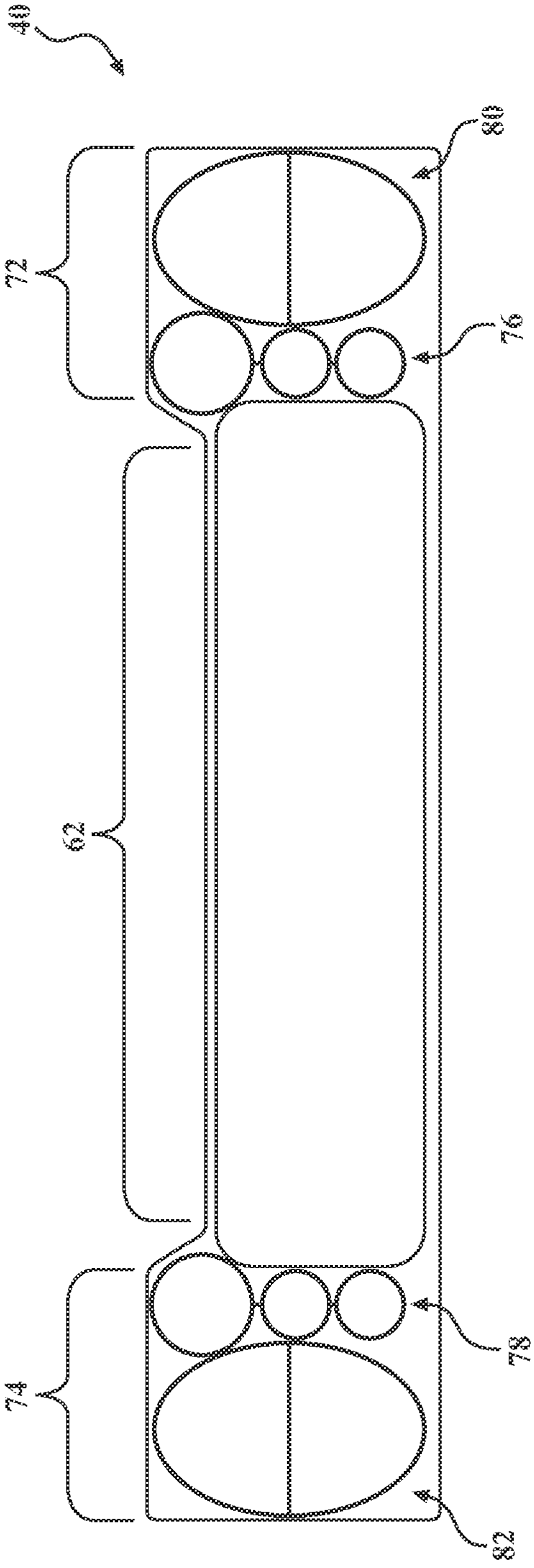
FIG. 10 is a schematic end view of an expandable patient support illustrating a plurality of bladders in fluid communication with each other.

The first auxiliary patient support section 72 includes one or more first inner bladders 76 and the second auxiliary patient support section 74 includes one or more second inner bladders 78. In the version shown, there is one first inner bladder 76 and one second inner bladder 78 that both have elongated shapes. When inflated, the first inner bladder 76 and the second inner bladder 78 may have generally cylindrical shapes, such as the shape of an elliptic cylinder, or any suitable shape. The first inner bladder 76 and the second inner bladder 78 may each include a plurality of bladders in fluid communication with each other that cumulatively form the first inner bladder 76 and the second inner bladder 78 (shown in FIG. 10). Pressures in the first inner bladder 76 and the second inner bladder 78 can be controlled separately from each other and separately from the main bladders 68, 70. The one or more first inner bladders 76 are arranged to extend longitudinally along the first side of the main patient support section 62, e.g., along a first side of the main bladders 68, 70. The one or more second inner bladders 78 are arranged to extend longitudinally along the second side of the main patient support section 62, e.g., along a second side of the main bladders 68, 70. When the expanded patient support 40 is in the collapsed configuration (e.g., at 36 inches), the one or more first inner bladders 76 and the one or more second inner bladders 78 are in inflated states.

The first auxiliary patient support section 72 also includes one or more first outer bladders 80 and the second auxiliary patient support section 74 includes one or more second outer bladders 82. In the version shown, there is one first outer bladder 80 and one second outer bladder 82 that both have elongated shapes. The first outer bladder 80 and the second outer bladder 82 may have generally cylindrical shapes, such as the shape of an elliptic cylinder, or any suitable shape. The first outer bladder 80 and the second outer bladder 82 may each include a plurality of bladders in fluid communication with each other that cumulatively form the first outer bladder 80 and the second outer bladder 82 (also shown in FIG. 10). Pressures in the first outer bladder 80 and the second outer bladder 82 can be controlled separately from each other, separately from the inner bladders 76, 78, and/or separately from the main bladders 68, 70. The one or more first outer bladders 80 are arranged to extend longitudinally along the one or more first inner bladders 76 and the one or more second outer bladders 82 are arranged to extend longitudinally along the one or more second inner bladders 78. The outer bladders 80, 82 are arranged and configured to expand outwardly from their adjacent inner bladders 76, 78.

When in the collapsed configuration (e.g., at 36 inches), the one or more first outer bladders 80 and the one or more second outer bladders 82 are deflated. The outer bladders 80, 82 can be inflated to expand the first and/or second auxiliary patient support sections 72, 74 away from the main patient support section 62. The first auxiliary patient support section 72 is expanded away from the main patient support section 62 to the expanded configuration shown in FIG. 5, e.g., by inflating the one or more first outer bladders 80 associated with the first auxiliary patient support section 72. The inner bladders 76, 78 remain inflated in this expanded configuration, but at different pressures as described further below. Both the first and second auxiliary patient support sections 72, 74 are expanded away from the main patient support section 62 in the expanded configuration shown in FIG. 6, e.g., by inflating the one or more first outer bladders 80 associated with the first auxiliary patient support section 72 and inflating the one or more second outer bladders 82 associated with the second auxiliary patient support section 74. The inner bladders 76, 78 remain inflated in this configuration as well, but at lower pressures than the outer bladders 80, 82, as described further below.

Figure 7A:
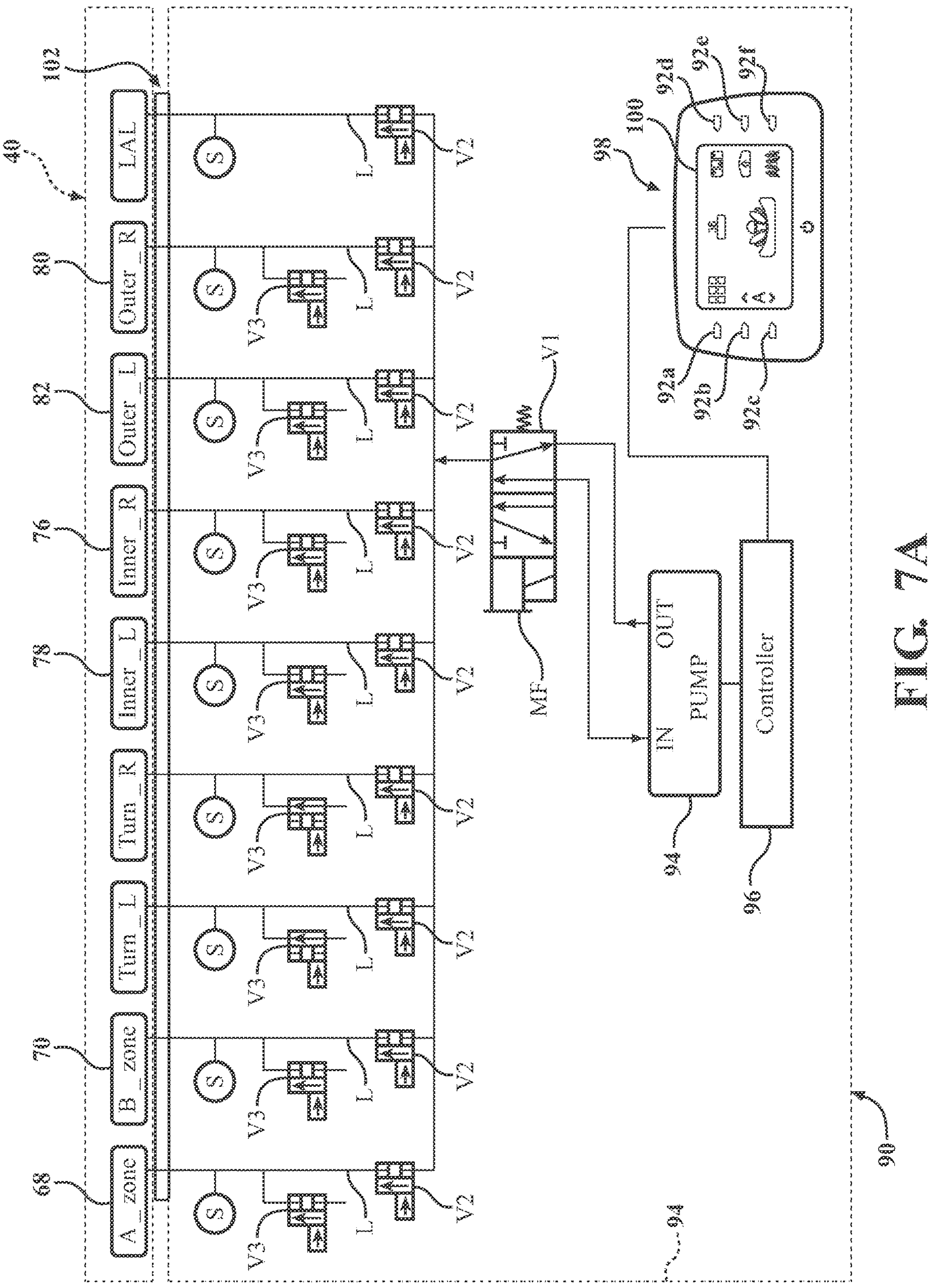
FIGS. 7A and 7B are schematic views of the control assembly and illustrates fluid routing and switching between inflation and deflation.

Referring to FIG. 7A, a control assembly 90 is shown to control operation of the expandable patient support 40. Collectively, the expandable patient support 40 and the control assembly 90 form a patient support system. The control assembly 90, in the version shown, includes a housing 92 and an inflator in the form of a fluid supply device 94 disposed within the housing 92 (see also FIG. 1). The fluid supply device 94 may comprise a pump, fan, blower, or the like, and associated motor or motors, for supplying fluid (e.g., air, water, other liquids, etc.) to the expandable patient support 40. The inflator is operatively coupled to the one or more main bladders 68, 70, the one or more inner bladders 76, 78, the one or more outer bladders 80, 82, turn bladders, and tubing from a low air loss (LAL) system.

A controller 96 is operatively coupled to the fluid supply device 94 to control operation of the fluid supply device 94. The controller 96 may include one or more microprocessors for processing instructions or for processing algorithms stored in memory to control operation of the fluid supply device 94 to supply fluid to the expandable patient support 40. Additionally, or alternatively, the controller 96 may include one or more microcontrollers, field programmable gate arrays, systems on a chip, discrete circuitry, graphics drivers, and/or other suitable hardware, software, or firmware that is capable of carrying out the functions described herein. The controller 96 may be carried on-board the control assembly 90 or may be remotely located. In some embodiments, the controller 96 is disposed inside the housing 92. Power to the fluid supply device 94, the controller 96, and other electronic components of the control assembly 90 may be provided by a battery power supply or an external power source. For example, the fluid supply device 94 may comprise a DC switchable power supply so that in different geographic regions, the same control assembly 90 may be employed with a different power cord. In other words, the control assembly 90 may be plugged into any voltage and be operational.

In some versions, the controller 96 includes an internal clock to keep track of time. In some versions, the internal clock is a microcontroller clock. The microcontroller clock may include a crystal resonator, a ceramic resonator, a resistor capacitor (RC), oscillator, or a silicon oscillator. Examples of other internal clocks other than those disclosed herein are fully contemplated. The internal clock may be implemented in hardware, software, or both. In some embodiments, memory, microprocessors, and microcontroller clock cooperate to send signals to and operate the various components shown in FIG. 7A to meet predetermined timing parameters. These predetermined timing parameters are discussed in more detail below.

A user interface 98 is operatively coupled to the controller 96 to enable a user, such as a caregiver, to provide input to operate the fluid supply device 94. The user interface 98 may include, for example, a touchscreen, push buttons, gesture sensors, piezoelectric elements, or the like to receive user input and generate corresponding input signals to be transmitted to the controller 96 to control operation of the fluid supply device 94 based on the input signals. The user interface 98 may further include a display 100 operatively coupled to the controller 96. The display 100 may be a light-emitting diode (LED) display, an electroluminescent display (ELD), a liquid crystal display (LCD), an organic light-emitting diode (OLED) display, or any other suitable display. The controller 96 generates and outputs graphical representations (e.g., images) and graphical animations of the various therapies, instructions, warnings, and the like on the display 100, as described further below. These graphical representations/animations may be stored as graphic information/images in memory of the controller 96 in any suitable format for being output onto the display 100 by the controller 96.

A fluid connector 102 (schematically represented in FIG. 7A) is provided to couple the housing 92 to the expandable patient support 40 to fluidly connect the fluid supply device 94 to the inflatable bladders 68, 70, 76, 78, 80, 82 of the expandable patient support 40. The connector 102 provides fluid communication between the fluid supply device 94 and the one or more inflatable bladders 68, 70 of the main patient support section 62 and the one or more inflatable bladders 76, 78, 80, 82 of the first and second auxiliary patient support sections 72, 74. The connector 102 also provides fluid communication between the fluid supply device 94 and inflatable turn bladders (if present). The connector 102 may also provide fluid communication between the fluid supply device 94 and fluid distribution tubing on the main patient support section 62 for providing low air loss (LAL) functionality to help reduce pressure ulcers on the patient. The connector 102 may be in the form of a plurality of fluid conduits with connecting (e.g. mating) interfaces to connect ports on the housing 92 to associated ports on the expandable patient support 40. Fluid supply lines L are present in the housing 92 to provide fluid communication from the fluid supply device 94 to the fluid connector 102. The fluid supply lines L include couplings and a plurality of conduits (nine shown).

One or more sensors S, such as pressure sensors, are coupled to the controller 96 and in communication with their respective fluid supply lines L to measure pressure within the inflatable bladders 68, 70, 76, 78, 80, 82 to which the supply lines L are connected, for example, or to measure pressure in the low air loss (LAL) system. For instance, the controller 96 may monitor pressure of the internal air within the main bladders 68, 70, the inner bladders 76, 78, and/or the outer bladders 80, 82, to separately control the pressures as described herein. The controller 96 may monitor pressure within the one or more inflatable bladders 68, 70, 76, 78, 80, 82 to determine the current pressure in the one or more inflatable bladders 68, 70, 76, 78, 80, 82 and adjust the pressure as desired.

Figure 7B:
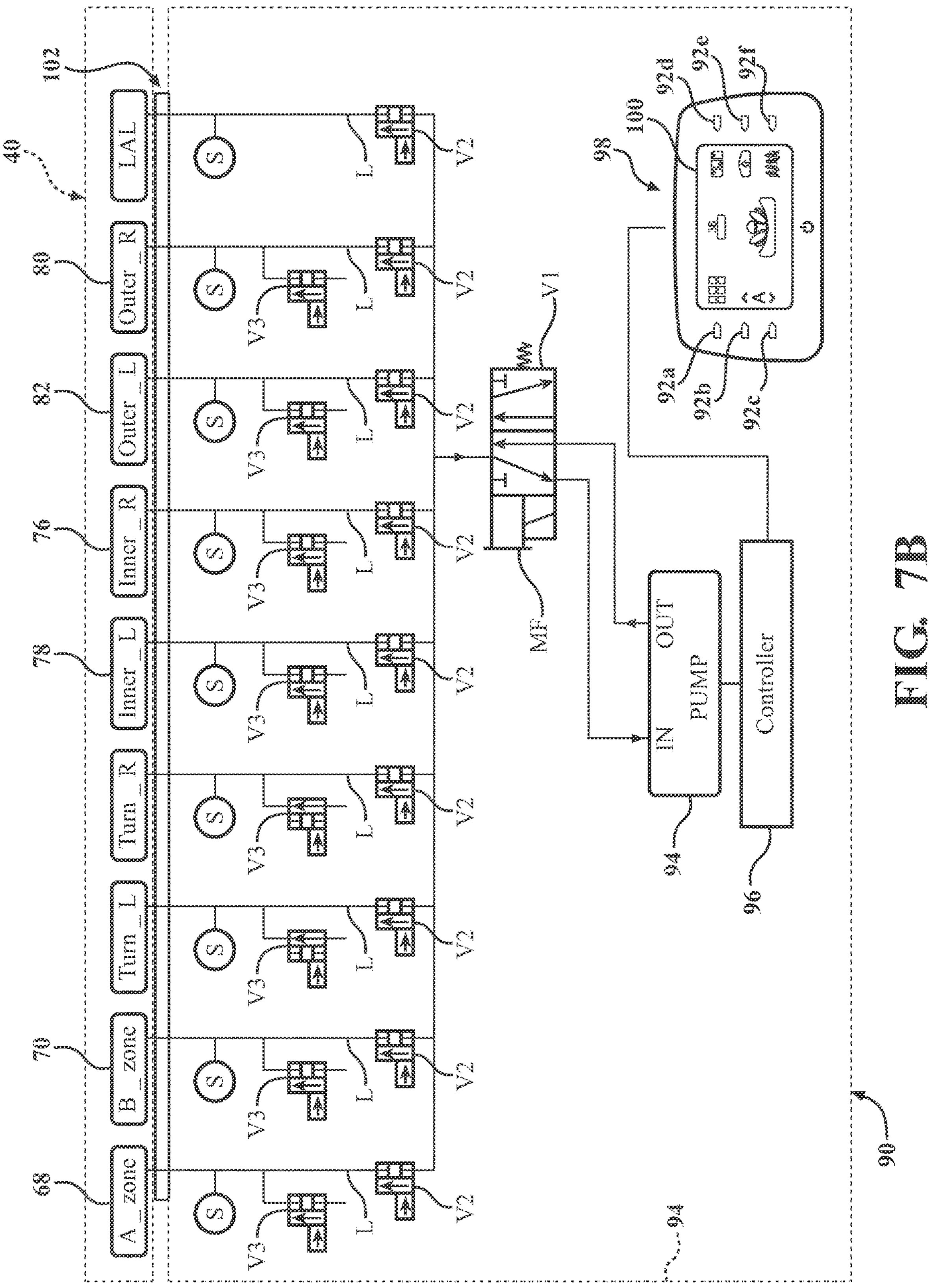

One suitable arrangement of valves V is shown in FIG. 7A for opening/closing fluid communication between the fluid supply device 94 and the expandable patient support 40 and between the expandable patient support 40 and atmosphere. For example, the fluid supply device 94 is shown connected to a manifold MF that includes a solenoid valve V1 connected to the controller 96. The solenoid valve V1 of the manifold MF is configured to move between inflation and deflation states. In the inflation state (FIG. 7A), an inlet of the fluid supply device 94 is opened to atmosphere and an outlet of the fluid supply device 94 is opened to be in fluid communication with the various supply lines L. In the deflation state (FIG. 7B), the inlet of the fluid supply device 94 is opened to be in fluid communication with the various supply lines L and the outlet of the fluid supply device 94 is opened to atmosphere. Sets of solenoid valves V2, V3 are shown for controlling fluid flow through each of the supply lines L. The first valve V2 is controlled by the controller 96 to open/close fluid communication between the fluid supply device 94 and the associated inflatable bladder or tubing of the LAL system. The second valve V3 is controlled by the controller 96 to open/close fluid communication between the fluid supply line L and atmosphere, e.g., to reduce pressure in the fluid supply line L. Other arrangements of the fluid supply device 94, valves V1, V2, V3, sensors S, and supply lines L are possible. In some versions, for example, a single manifold with valving may be provided in the control assembly 90. In some versions, ports to atmosphere may be connected to a separate vacuum pump to pull fluid (e.g., air) out of the respective inflatable bladders of the expandable patient support 40 as needed.

Figure 8:
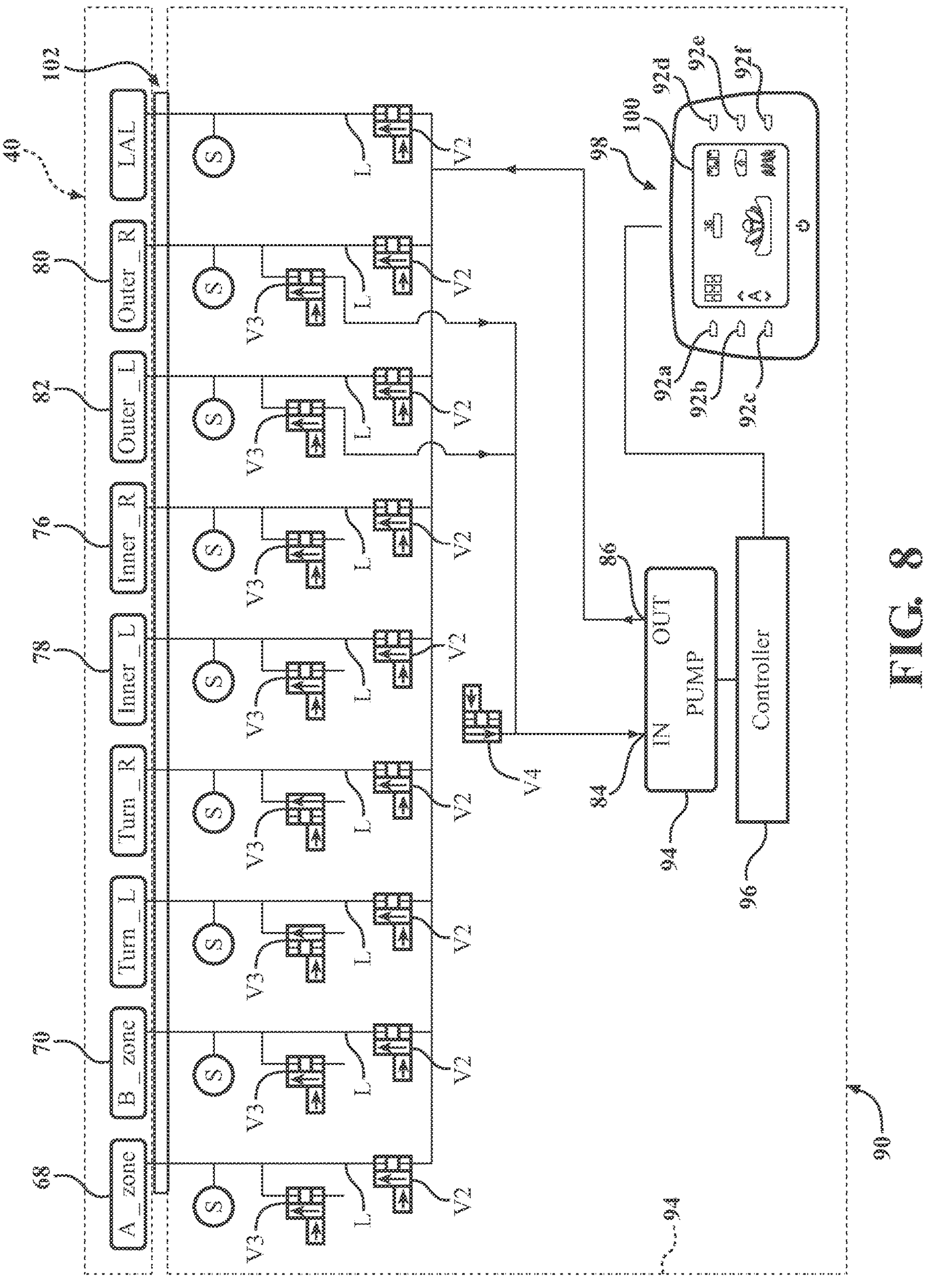
FIG. 8 is a schematic view of the control assembly and illustrates an additional arrangement of fluid routing and switching for operating a low air loss system.

An additional arrangement, such as shown in FIG. 8, may provide an alternative architecture for providing low air loss (LAL) functionality to help reduce pressure ulcers on the patient. The control assembly 90, in the arrangement shown, includes a housing 92 and a fluid supply device 94 disposed within the housing 92. The fluid supply device 94 may comprise a pump capable of producing a vacuum pressure at an inlet 84 and a positive pressure at an outlet 86. The pump 94 may be configured to direct air through one or more supply lines (L) coupled to the outlet 86 to inflate the one or more main bladders 68, 70, the one or more inner bladders 76, 78, the one or more outer bladders 80, 82, turn bladders, and operate low air loss (LAL) system.

The arrangement of FIG. 8 also includes sets of solenoid valves V2, V3 for controlling fluid flow through each of the supply lines L. The first valve V2 is controlled by the controller 96 to open/close fluid communication between the pump 94 and the associated inflatable bladder or tubing of the LAL system. The second valve V3 (also referred to as a bladder vent valve), is controlled by the controller 96 and may be configured to move between an open state and a closed state to open/close fluid communication between the fluid supply line L connected to its associated bladder and the inlet 84 of the pump 94. Additionally, the arrangement of FIG. 8 may include a pump vent valve V4 operatively coupled to the pump 94 and configured to move between a first state and a second state. In the first state, the inlet 84 of the pump 94 is coupled in fluid communication with the one or more bladders 68, 70, 76, 78, 80, 82 when one or more bladder vent valves V3 are in the open state such that the vacuum pressure of the inlet 84 deflates the one or more bladders 68, 70, 76, 78, 80, 82. In the second state, the inlet 84 of the pump 94 in is fluid communication with atmosphere.

The arrangement of FIG. 8 further includes a controller 96. The controller may be coupled to the pump 94, the solenoid valves V2, the one or more bladder vent valves V3, and the pump vent valve V4. The controller may be configured to operate in a variety of modes. In a first mode, the controller 96 may operate the patient support system such that the one or more bladder vent valves V3 are in the closed state, and the pump vent valve V4 is in the second state such that the pump 94 directs air from atmosphere to the one or more supply lines (L) to inflate the one or more bladders 68, 70, 76, 78, 80, 82. In a second mode, the controller 96 may operate the patient support system such that the one or more bladder vent valves V3 are in the closed state, and the pump vent valve V4 is in the second state such that the pump 94 directs air from atmosphere to the one or more supply lines (L) to operate the low air loss (LAL) circuit. In a third mode, the controller 96 may operate the patient support system such that the one or more bladder vent valves V3 are in the open state, and the pump vent valve V4 is in the first state such that the pump directs air from the one or more bladders 68, 70, 76, 78, 80, 82 (i.e., deflating the bladders) to the one or more supply lines (L) to operate the low air loss (LAL) circuit.

Advantageously, the arrangement of FIG. 8 enables the vacuum pressure produced by the pump 94 at the inlet 84 to quickly deflate the one or more bladders 68, 70, 76, 78, 80, 82 in a cost effective manner by utilizing the low air loss (LAL) circuit as a means of air discharge from the patient support system. In particular, the arrangement of FIG. 8 provides the advantages of reducing any noise produced when deflating the one or more bladders 68, 70, 76, 78, 80, 82, and reduces the cost of the patient support system by eliminating the need for additional components to diffuse air when deflating the one or more bladders 68, 70, 76, 78, 80, 82.

Figure 9B:
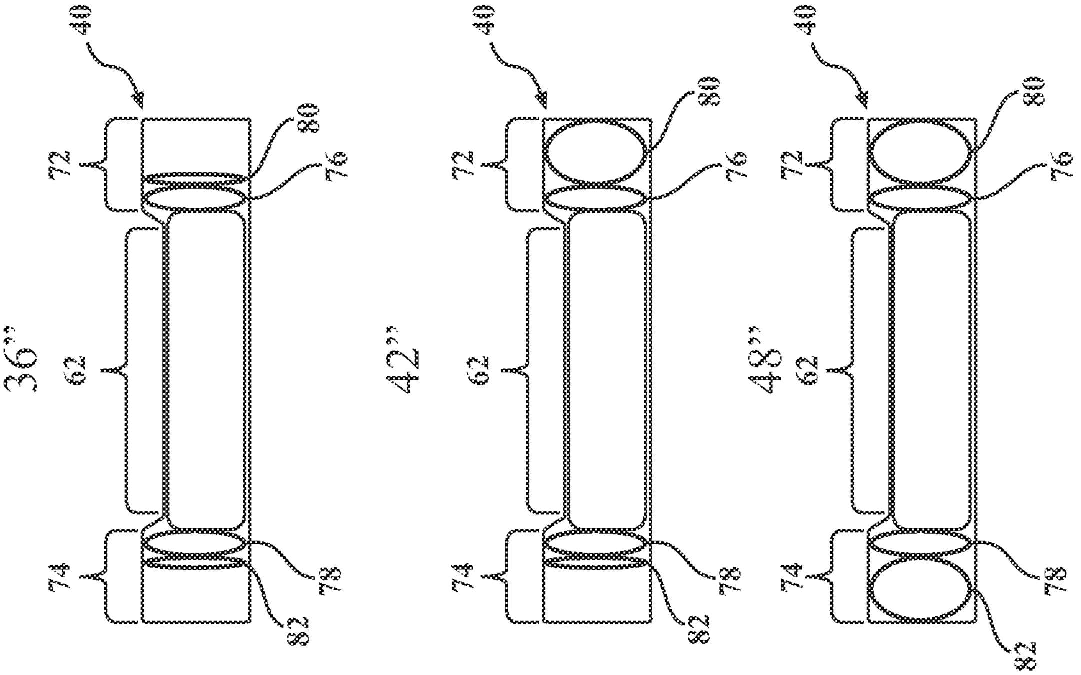
FIGS. 9A and 9B are schematic top and end views of the expandable patient support illustrating expansion of the expandable patient support.
Figure 9A:
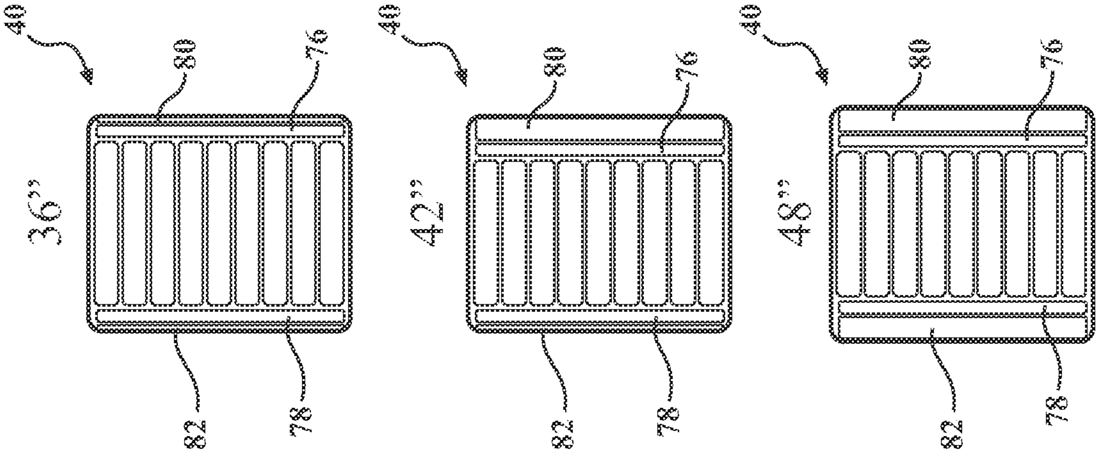

FIGS. 9A and 9B illustrate expansion of the expandable patient support 40 from its first configuration (e.g., 36 inches), to a second configuration (e.g., 42 inches), and to a third configuration (e.g., 48 inches). As shown, the inner bladders 76, 78 remain inflated in all configurations, i.e., at all widths. Thus, expansion is controlled by inflating/deflating the outer bladders 80, 82.

The controller 96 is configured to provide pressure in the one or more first inner bladders 76 and the one or more second inner bladders 78 at a first value when the expandable patient support 40 is in the first configuration. The outer bladders 80, 82 remain deflated in the first configuration. In some versions, in the first configuration, the one or more first inner bladders 76 and the one or more second inner bladders 78 are maintained with internal air pressures higher than pressures in the main bladders 68, 70. Additionally, or alternatively, when fully inflated (and with the patient present or removed), top surfaces of the inner bladders 76, 78 may extend above top surfaces of the main bladders 68, 70 (see FIG. 9B) so that the inner bladders 76, 78 act as supportive rails along the first and second sides of the main bladders 68, 70. Thus, the inner bladders 76, 78 may be maintained at a higher pressure than the main bladders 68, 70, and extend above the main bladders 68, 70, to present a side bumper that aids in keeping the patient in place as well as facilitate an edge for improved ingress/egress (see FIG. 9B).

The controller 96 is configured to reduce the pressure in the one or more first inner bladders 76 to a second value, lower than the first value, in response to inflating the one or more first outer bladders 80 to expand the expandable patient support 40 to the second configuration. The controller 96 is configured to inflate the one or more first outer bladders 80 to a pressure having a third value, higher than the second value, when expanding the expandable patient support 40 to the first configuration. The controller 96 is configured to continue providing pressure in the one or more second inner bladders 78 at the first value when the expandable patient support 40 is in the second configuration such that the one or more first outer bladders 80 provide the supportive rail on one side of the expandable patient support 40 and the one or more second inner bladders 78 provide the support rail on the opposite side of the expandable patient support 40 (since the one or more second outer bladders 82 remain deflated in this configuration).

Figure 11:
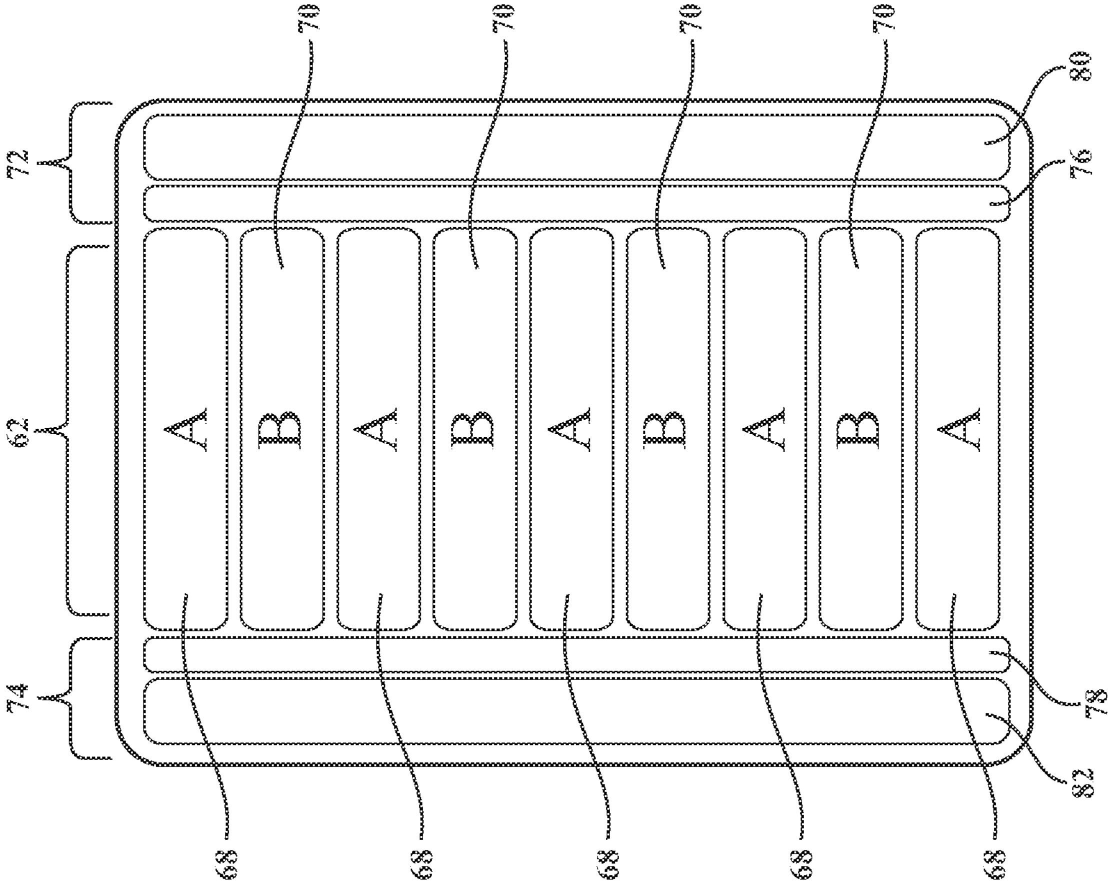
FIG. 11 is a schematic illustration of the expandable patient support in a fully expanded configuration.
Figure 12:
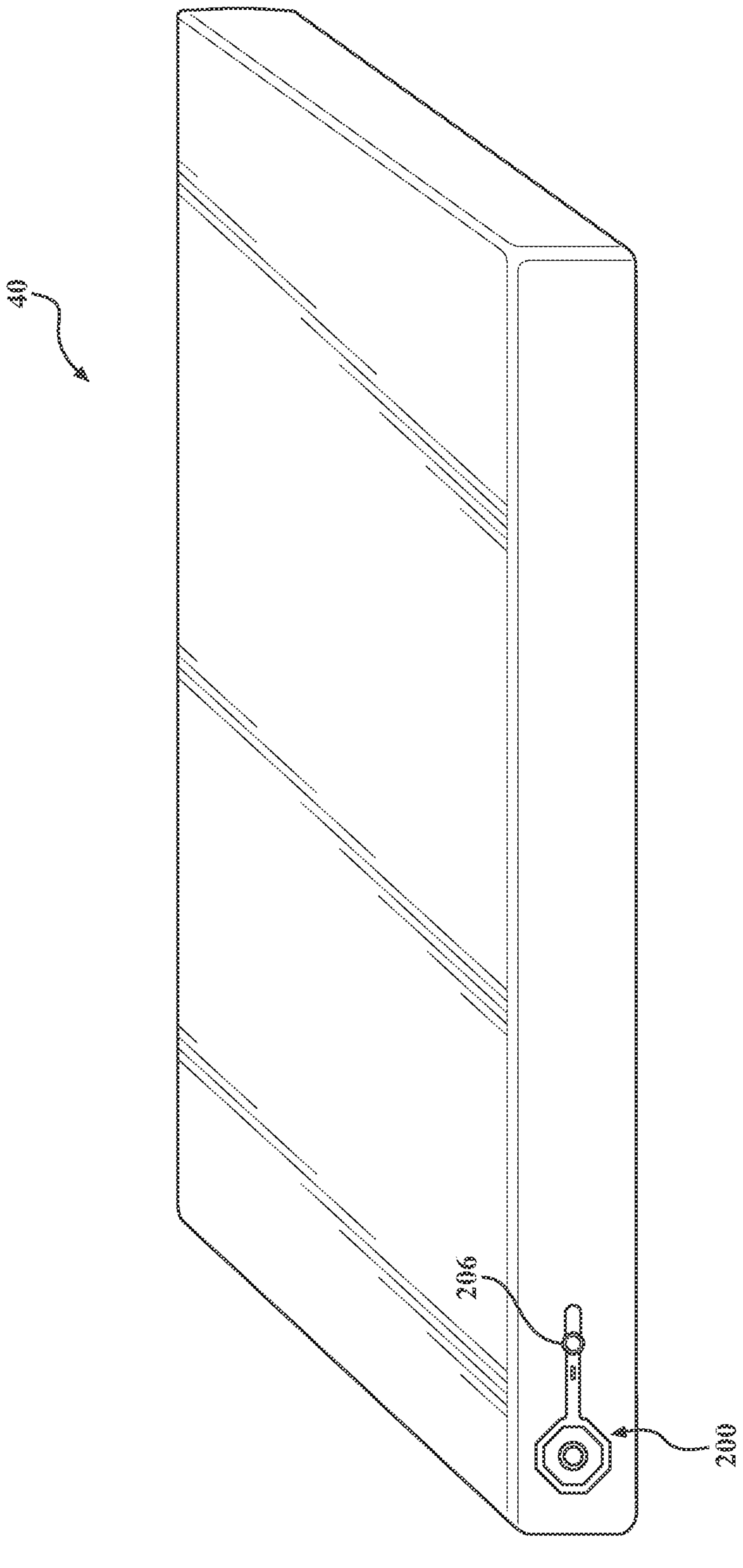
FIG. 12 is a perspective view of an expandable patient support having a dump valve for an auxiliary patient support section.
Figure 13:
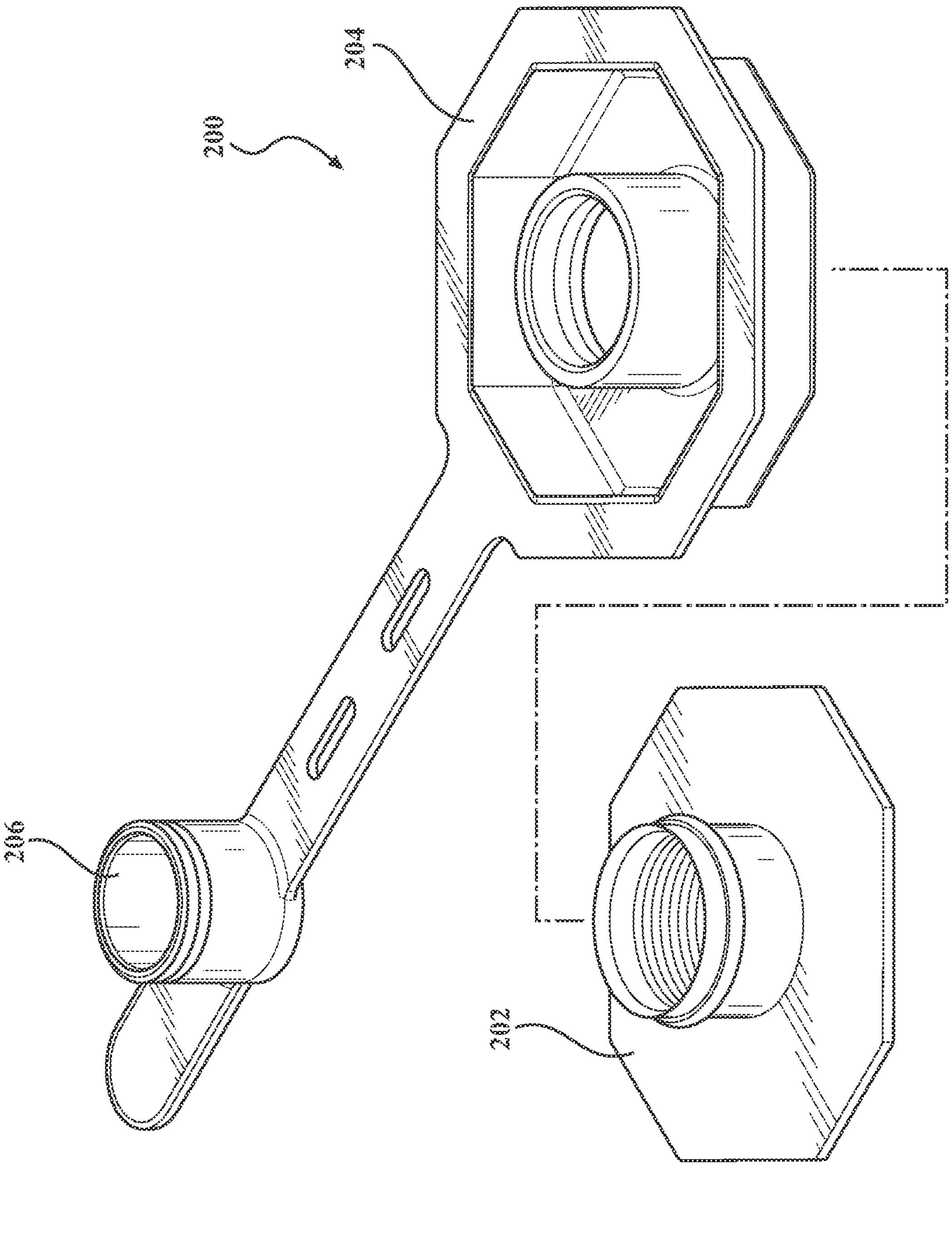
FIG. 13 is a perspective, exploded view of the dump valve including an outer piece and a bladder piece.
Figure 14:
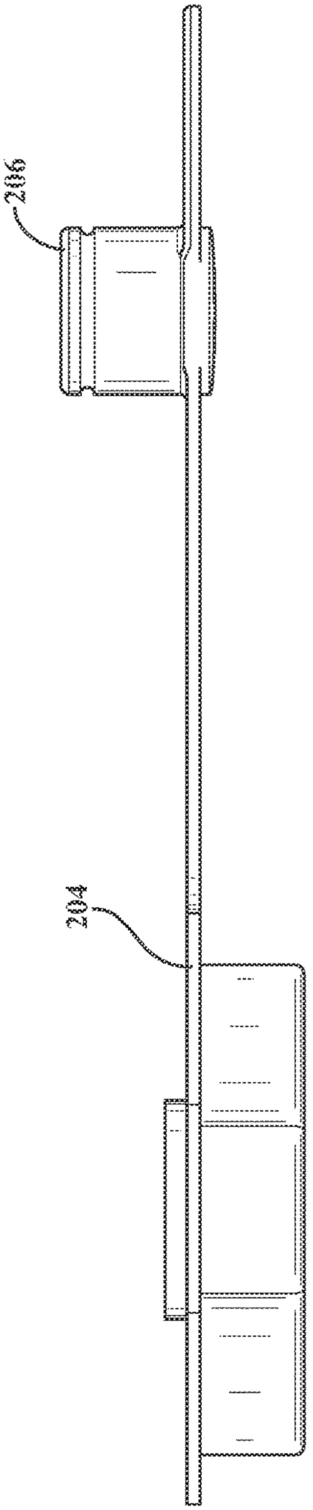
FIG. 14 is an elevational view of the outer piece.
Figure 15:
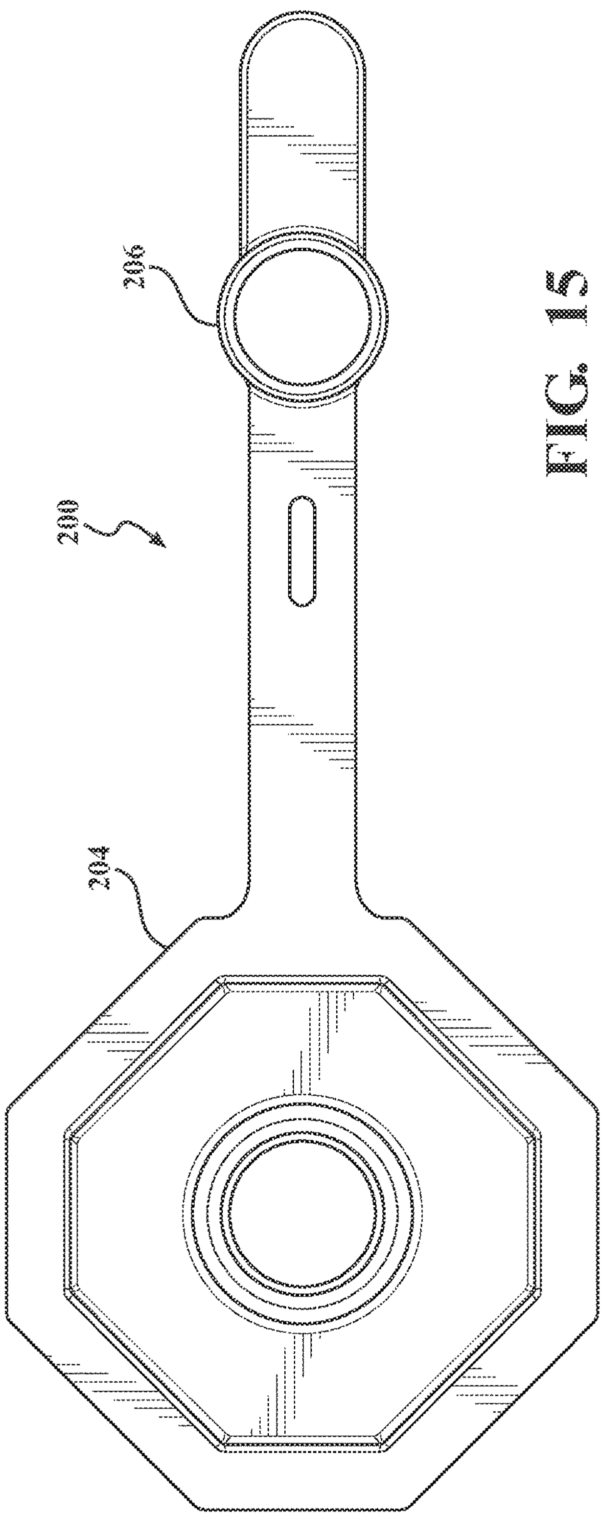
FIG. 15 is a top view of the outer piece.

The controller 96 is configured to reduce the pressure in the one or more second inner bladders 78 to the second value (e.g., the same as the one or more first inner bladders 76), in response to inflating the one or more second outer bladders 82 to expand the expandable patient support 40 to the third configuration (see also FIG. 11). The controller 96 is configured to inflate the one or more second outer bladders 82 to a pressure at the third value when expanding the expandable patient support 40 to the third configuration. In some versions, the third value is the same as the first value. Additionally, or alternatively, when fully inflated (and with the patient present or removed), top surfaces of the outer bladders 80, 82 may extend above the top surfaces of the main bladders 68, 70 (see FIG. 9B) so that the outer bladders 80, 82 act as supportive rails along the first and second sides of the main bladders 68, 70 in the third configuration. Thus, the outer bladders 80, 82 may be maintained at a higher pressure than the main bladders 68, 70, and at a higher pressure than the inner bladders 76, 78, and extend above the main bladders 68, 70, to present a side bumper that aids in keeping the patient in place as well as facilitate an edge for improved ingress/egress (see FIG. 9B).

The controller 96 may be configured to control pressure in the first plurality of main bladders 68, which are in fluid communication with each other, to be at the second value or other similar value, and the controller 96 may control pressure in the second plurality of main bladders 70, which are in fluid communication with each other, to be at the second value or other similar value. The first plurality of main bladders 68 are inflatable separately from the second plurality of main bladders 70 such that the main bladders 68 form a first zone A and the main bladders 70 form a second zone B (shown in FIG. 11).

The controller 96 is configured to provide pressures in the main bladders 68, 70 at values less than the first and third values (which may be equal), i.e., less than the outermost, inflated bladder, when the expandable patient support 40 is in any of the described configurations. In some versions, the main bladders 68, 70 remain inflated to at least a minimum internal air pressure (e.g., 7 mmHg or other threshold). The controller 96 can separately and independently control the pressures in the first and second zones A, B, such as when varying inflation pressures to reduce pressure ulcers in patients. For instance, the controller 96 can switch pressures in zones A, B (e.g., between 37 and 43 mmHg or other values) every 6 minutes (or other time period) while maintaining 6 mmHg pressure differential (or other differential) between the zones A, B. In some versions, the second value of pressure is an average of the pressures measured in the main bladders 68, 70 by the controller 96 via the sensors S. In some versions, the first value of pressure is from 50 to 80 mmHg, the second value of pressure is from 5 to 50 mmHg, and third value of pressure is from 50 to 80 mmHg. The pressure values described herein may be pressures with the patient present on the expandable patient support 40. Alternatively, the pressure values described herein may be pressures without the patient.

In some examples, when in the first configuration (e.g., 36 inches), the main bladders 68, 70 are controlled to have internal air pressures of greater than 0 mmHg (e.g., from 5 to 50 mmHg, from 5 to 45 mmHg, from 5 to 40 mmHg, from 10 to 40 mmHg, from 15 to 40 mmHg, from 20 to 40 mmHg, about 20 mmHg, about 15 mmHg, or the like), the inner bladders 76, 78 are controlled to have internal air pressures of 46 mmHg or greater (e.g., from 46 to 80 mmHg, from 50 to 75 mm Hg, from 65 to 75 mmHg, from 60 to 70 mmHg, about 70 mmHg, or the like) and the outer bladders 80, 82 remain deflated, e.g., with internal air pressures of 0 mmHg.

In some examples, when in the second configuration (e.g., 42 inches), the main bladders 68, 70 are controlled to have internal air pressures of greater than 0 mmHg (e.g., from 5 to 50 mmHg, from 5 to 45 mmHg, from 5 to 40 mmHg, from 10 to 40 mmHg, from 15 to 40 mmHg, from 20 to 40 mmHg, about 20 mmHg, about 15 mmHg, or the like), the one or more first inner bladders 76 are controlled to have an internal air pressure of greater than 0 mmHg (e.g., from 5 to 50 mmHg, from 5 to 45 mmHg, from 5 to 40 mmHg, from 10 to 40 mmHg, from 15 to 40 mmHg, from 20 to 40 mmHg, about 20 mmHg, about 15 mmHg, or the like), the one or more second inner bladders 78 are controlled to have an internal air pressure of 46 mmHg or greater (e.g., from 46 to 80 mmHg, from 50 to 75 mm Hg, from 65 to 75 mmHg, from 60 to 70 mmHg, about 70 mmHg, or the like), the first outer bladder 80 is inflated to an internal air pressure of 46 mmHg or greater (e.g., from 50 to 80 mmHg, from 50 to 75 mm Hg, from 65 to 75 mmHg, from 60 to 70 mmHg, about 70 mmHg, or the like), and the second outer bladder 82 remains deflated, e.g., with internal air pressures of 0 mmHg.

In some examples, when in the second expanded configuration (e.g., 48 inches), the main bladders 68, 70 are controlled to have internal air pressures of greater than 0 mmHg (e.g., from 5 to 50 mmHg, from 5 to 45 mmHg, from 5 to 40 mmHg, from 10 to 40 mmHg, from 15 to 40 mmHg, from 20 to 40 mmHg, about 20 mmHg, about 15 mmHg, or the like), the inner bladders 76, 78 are controlled to have internal air pressures of greater than 0 mmHg (e.g., from 5 to 50 mmHg, from 5 to 45 mmHg, from 5 to 40 mmHg, from 10 to 40 mmHg, from 15 to 40 mmHg, from 20 to 40 mmHg, about 20 mmHg, about 15 mmHg, or the like), and the outer bladders 80, 82 are inflated to internal air pressures of 46 mmHg or greater (e.g., from 50 to 80 mmHg, from 50 to 75 mm Hg, from 65 to 75 mmHg, from 60 to 70 mmHg, about 70 mmHg, or the like).

FIG. 12 through 15 illustrate a two-piece dump valve 200 to be incorporated into sides of the expandable patient support 40 with one dump valve 200 associated with each of the outer bladders 80, 82. The dump valve 200 enables the associated outer bladder 80, 82 to be dumped to atmosphere through the cover assembly 66, i.e., to reduce pressure in the outer bladder 80, 82. When the dump valve 200 is open it allows for rapid evacuation of the air in the outer bladder 80, 82 so the caregiver can begin collapsing the deck sections to a smaller size. An inner valve piece 202 of the dump valve 200 welds to the associated bladder wall. An outer valve piece 204 is welded to the bottom cover 66*b*. This enables an inner valve piece 202 to mate with the outer valve piece 204 to produce an airtight seal when a cap 206 is in place. This also allows for removal and service replacement of the outer bladder 80, 82 when the outer bladder 80. 82 is not being permanently affixed to the cover assembly 66. The two pieces 202, 204 of the dump valve 200 remain secured together due to their geometry and interference fit between the two pieces 202, 204.

Several configurations have been discussed in the foregoing description. However, the configurations discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

The present disclosure also comprises the following clauses, with specific features laid out in dependent clauses, that may specifically be implemented as described in greater detail with reference to the configurations and drawings above.

CLAUSES

I. A patient support system for use on a litter of a patient support apparatus, the patient support system comprising:

an expandable patient support including:

a main patient support section having opposing sides; and an auxiliary patient support section having one or more inner bladders extending longitudinally along one of the opposing sides of the main patient support section and one or more outer bladders extending longitudinally along the one or more inner bladders, the one or more outer bladders being expandable away from the one or more inner bladders to expand an overall width of the expandable patient support from a first width to a second width; and a control assembly connectable to the expandable patient support, the control assembly including:

an inflator to be operatively coupled to the one or more inner bladders and the one or more outer bladders; and a controller coupled to the inflator, wherein the controller is configured to provide pressure in the one or more inner bladders at a first value when the expandable patient support is at the first width and the controller is configured to reduce the pressure in the one or more inner bladders to a second value, lower than the first value, in response to inflating the one or more outer bladders to expand the expandable patient support to the second width.

II. The patient support system of clause I, wherein the controller is configured to inflate the one or more outer bladders to a pressure having a third value, higher than the second value, when expanding the expandable patient support to the second width.

III. The patient support system of clause II, wherein the auxiliary patient support section is further defined as a first auxiliary patient support section, the one or more inner bladders are further defined as one or more first inner bladders, and the one or more outer bladders are further defined as one or more first outer bladders, wherein the expandable patient support includes a second auxiliary patient support section having one or more second inner bladders extending longitudinally along the other of the opposing sides of the main patient support section and one or more second outer bladders extending longitudinally along the one or more second inner bladders, the one or more second outer bladders being expandable away from the one or more second inner bladders to expand an overall width of the expandable patient support from the second width to a third width.

IV. The patient support system of clause III, wherein the inflator is to be operatively coupled to the one or more second inner bladders and the one or more second outer bladders.

V. The patient support system of clause IV, wherein the controller is configured to provide pressure in the one or more second inner bladders at the first value when the expandable patient support is at the second width and the controller is configured to reduce the pressure in the one or more second inner bladders to the second value, in response to inflating the one or more second outer bladders to expand the expandable patient support to the third width.

VI. The patient support system of clause V, wherein the controller is configured to inflate the one or more second outer bladders to a pressure at the third value when expanding the expandable patient support to the third width.

VII. The patient support system of clause VI, wherein the main patient support section includes a first plurality of bladders in fluid communication with each other and a second plurality of bladders in fluid communication with each other, the first plurality of bladders being inflatable separately from the second plurality of bladders.

VIII. The patient support system of clause VII, wherein the controller is configured to provide pressures in the first plurality of bladders and the second plurality of bladders at values less than the third value when the expandable patient support is at the second width or the third width.

IX. The patient support system of clause VIII, wherein the second value is an average of the pressures in the first plurality of bladders and the second plurality of bladders.

X. The patient support system of any of clauses I-IX, wherein the first value is from 50 to 80 mmHg and the second value is from 5 to 50 mmHg.

XI. A method for reconfiguring a patient support system for use on a litter of a patient support apparatus, the patient support system including an expandable patient support having a main patient support section and an auxiliary patient support section, and a control assembly including an inflator to expand the auxiliary patient support section, the method comprising the steps of:

providing pressure in one or more inner bladders of the auxiliary patient support section at a first value when the expandable patient support is at a first width, the one or more inner bladders extending longitudinally along one side of the main patient support section;

inflating one or more outer bladders of the auxiliary patient support section to expand the expandable patient support from the first width to a second width, the one or more outer bladders extending longitudinally along the one or more inner bladders; and reducing the pressure in the one or more inner bladders to a second value, lower than the first value, in response to inflating the one or more outer bladders to expand the expandable patient support to the second width.

XII. The method of clause XI, comprising inflating the one or more outer bladders to a pressure having a third value, higher than the second value, when expanding the expandable patient support to the second width.

XIII The method of clause XII, comprising providing pressure in one or more second inner bladders at the first value when expanding the expandable patient support to the second width, wherein the auxiliary patient support section is further defined as a first auxiliary patient support section, the one or more inner bladders are further defined as one or more first inner bladders, and the one or more outer bladders are further defined as one or more first outer bladders, wherein the expandable patient support includes a second auxiliary patient support section having the one or more second inner bladders extending longitudinally along an opposing side of the main patient support section and one or more second outer bladders extending longitudinally along the one or more second inner bladders, the one or more second outer bladders being expandable away from the one or more second inner bladders to expand an overall width of the expandable patient support from the second width to a third width.

XIV. The method of clause XIII, comprising inflating the one or more second outer bladders to expand the expandable patient support to the third width.

XV. The method of clause XIV, comprising reducing the pressure in the one or more second inner bladders to the second value, in response to inflating the one or more second outer bladders to expand the expandable patient support to the third width.

XVI. The method of clause XV, comprising inflating the one or more second outer bladders to a pressure at the third value when expanding the expandable patient support to the third width.

XVII. The method of clause XVI, comprising controlling pressure in a first plurality of bladders in fluid communication with each other and controlling pressure in a second plurality of bladders in fluid communication with each other, the pressure of the first plurality of bladders being controllable separately from the pressure of the second plurality of bladders.

XVIII. The method of clause XVII, comprising providing pressures in the first plurality of bladders and the second plurality of bladders at values less than the third value when the expandable patient support is at the second width or the third width.

XIX. The method of clause XVIII, wherein the second value is an average of the pressures in the first plurality of bladders and the second plurality of bladders.

XX. The method of any of clauses XI-XIX, wherein the first value is from 50 to 80 mmHg and the second value is from 5 to 50 mmHg.

XXI. A patient support system for use on a litter of a patient support apparatus, the patient support system comprising:

- a patient support having one or more bladders;
- a low air loss circuit arranged to diffuse air to one or more regions of the patient support to manage temperature and moisture of the patient support;
- a pump capable of producing a vacuum pressure at an inlet and a positive pressure at an outlet, the pump configured to direct air through one or more supply lines coupled to the outlet to inflate the one or more bladders or operate the low air loss circuit;
- one or more bladder vent valves operatively coupled to the one or more bladders and configured to move between an open state and a closed state;
- a pump vent valve operatively coupled to the pump and configured to move between a first state and a second state, wherein:
  - the inlet of the pump is coupled in fluid communication with the one or more bladders when the pump vent valve is in the first state and the one or more bladder vent valves are in the open state such that the vacuum pressure of the inlet deflates the one or more bladders; and
  - the inlet of the pump in is fluid communication with atmosphere when the pump vent valve is in the second state; and
- a controller coupled to the pump, the one or more bladder vent valves, and the pump vent valve, wherein the controller is configured to:
  - operate the patient support system in a first mode wherein the one or more bladder vent valves are in the closed state, and the pump vent valve is in the second state such that the pump directs air from atmosphere to the one or more supply lines to inflate the one or more bladders;
  - operate the patient support system in a second mode wherein the one or more bladder vent valves are in the closed state, and the pump vent valve is in the second state such that the pump directs air from atmosphere to the one or more supply lines to operate the low air loss circuit; and
  - operate the patient support system in a third mode wherein the one or more bladder vent valves are in the open state, and the pump vent valve is in the first state such that the pump directs air from the one or more bladders to the one or more supply lines to operate the low air loss circuit.

XXII. The system of clause XXI, wherein the patient support further comprises a main patient support section having opposing sides, and an auxiliary patient support section having one or more inner bladders extending longitudinally along one of the opposing sides of the main patient support section and one or more outer bladders extending longitudinally along the one or more inner bladders, the one or more outer bladders being expandable away from the one or more inner bladders to expand an overall width of the patient support from a first width to a second width.

What is claimed is:

1. A patient support system for use on a litter of a patient support apparatus, the patient support system comprising:

- an expandable patient support including:
  - a main patient support section having opposing left and right sides,
  - a left auxiliary patient support section having one or more left inner bladders extending longitudinally along the left side of the main patient support section and one or more left outer bladders extending longitudinally along the one or more left inner bladders, the one or more left outer bladders being expandable away from the one or more left inner bladders to expand an overall width of the expandable patient support from a first width to a second width, and
  - a right auxiliary patient support section having one or more right inner bladders extending longitudinally along the right side of the main patient support section and one or more right outer bladders extending longitudinally along the one or more right inner bladders; and
- a control assembly connectable to the expandable patient support, the control assembly including:
  - an inflator to be operatively coupled to the one or more left inner bladders and the one or more left outer bladders; and
  - a controller coupled to the inflator, wherein the controller is configured to provide pressure in the one or more left inner bladders at a first value when the expandable patient support is at the first width and the controller is configured to reduce the pressure in the one or more left inner bladders to a second value, lower than the first value, in response to inflating the one or more left outer bladders to expand the expandable patient support to the second width.

2. The patient support system of claim 1, wherein the controller is configured to inflate the one or more left outer bladders to a pressure having a third value, higher than the second value, when expanding the expandable patient support to the second width.

3. The patient support system of claim 2, wherein the one or more right outer bladders are expandable away from the one or more right inner bladders to expand an overall width of the expandable patient support from the second width to a third width.

4. The patient support system of claim 3, wherein the inflator is to be operatively coupled to the one or more right inner bladders and the one or more right outer bladders.

5. The patient support system of claim 4, wherein the controller is configured to provide pressure in the one or more right inner bladders at the first value when the expandable patient support is at the second width and the controller is configured to reduce the pressure in the one or more right inner bladders to the second value, in response to inflating the one or more right outer bladders to expand the expandable patient support to the third width.

6. The patient support system of claim 5, wherein the controller is configured to inflate the one or more right outer bladders to a pressure at the third value when expanding the expandable patient support to the third width.

7. The patient support system of claim 6, wherein the main patient support section includes a first plurality of bladders in fluid communication with each other and a second plurality of bladders in fluid communication with each other, the first plurality of bladders being inflatable separately from the second plurality of bladders.

8. The patient support system of claim 7, wherein the controller is configured to provide pressures in the first plurality of bladders and the second plurality of bladders at values less than the third value when the expandable patient support is at the second width or the third width.

9. The patient support system of claim 8, wherein the second value is an average of the pressures in the first plurality of bladders and the second plurality of bladders.

10. The patient support system of claim 1, wherein the first value is from 50 to 80 mmHg and the second value is from 5 to 50 mmHg.

11. A method for reconfiguring a patient support system for use on a litter of a patient support apparatus, the patient support system including an expandable patient support having a main patient support section and left and right auxiliary patient support sections, and a control assembly including an inflator to expand the left and right auxiliary patient support sections, the method comprising the steps of:

providing pressure in one or more left inner bladders of the left auxiliary patient support section at a first value when the expandable patient support is at a first width, the one or more left inner bladders extending longitudinally along a left side of the main patient support section;

inflating one or more left outer bladders of the left auxiliary patient support section to expand the expandable patient support from the first width to a second width, the one or more left outer bladders extending longitudinally along the one or more left inner bladders; and reducing the pressure in the one or more left inner bladders to a second value, lower than the first value, in response to inflating the one or more left outer bladders to expand the expandable patient support to the second width.

12. The method of claim 11, comprising inflating the one or more left outer bladders to a pressure having a third value, higher than the second value, when expanding the expandable patient support to the second width.

13. The method of claim 12, comprising providing pressure in one or more right inner bladders of the right auxiliary patient support section at the first value when expanding the expandable patient support to the second width, the one or more right inner bladders extending longitudinally along a right side of the main patient support section with one or more right outer bladders extending longitudinally along the one or more right inner bladders, the one or more right outer bladders being expandable away from the one or more right inner bladders to expand an overall width of the expandable patient support from the second width to a third width.

14. The method of claim 13, comprising inflating the one or more right outer bladders to expand the expandable patient support to the third width.

15. The method of claim 14, comprising reducing the pressure in the one or more right inner bladders to the second value, in response to inflating the one or more right outer bladders to expand the expandable patient support to the third width.

* * * * *